(12) United States Patent
Kondo

(10) Patent No.: US 11,344,926 B2
(45) Date of Patent: May 31, 2022

(54) FOREIGN SUBSTANCE REMOVING DEVICE

(71) Applicant: KOITO MANUFACTURING CO., LTD., Tokyo (JP)

(72) Inventor: Masayuki Kondo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/643,400

(22) PCT Filed: Aug. 3, 2018

(86) PCT No.: PCT/JP2018/029290
§ 371 (c)(1),
(2) Date: Feb. 28, 2020

(87) PCT Pub. No.: WO2019/044389
PCT Pub. Date: Mar. 7, 2019

(65) Prior Publication Data
US 2020/0254493 A1     Aug. 13, 2020

(30) Foreign Application Priority Data

Aug. 28, 2017    (JP) .............................. JP2017-163237
Aug. 28, 2017    (JP) .............................. JP2017-163238
Aug. 28, 2017    (JP) .............................. JP2017-163239

(51) Int. Cl.
     *B08B 5/02*       (2006.01)
     *B60S 1/54*       (2006.01)
     (Continued)

(52) U.S. Cl.
     CPC ....... *B08B 5/02* (2013.01); *B60S 1/54* (2013.01); *B08B 3/02* (2013.01); *B60S 1/52* (2013.01); *B60S 1/60* (2013.01); *H04N 5/225* (2013.01)

(58) Field of Classification Search
     CPC ..... B08B 5/02; B08B 3/02; B60S 1/54; B60S 1/52; B60S 1/60; B60S 1/48; B60S 1/56;
     (Continued)

(56) References Cited

U.S. PATENT DOCUMENTS 5,083,339 A * 1/1992 Bristow .................... B60S 1/10
                                                           15/250.002
5,636,794 A * 6/1997 Hess ......................... B05B 1/08
                                                            137/539

(Continued)

FOREIGN PATENT DOCUMENTS

DE    102007003384 A1   7/2008
EP        1199480 A2     4/2002
(Continued)

OTHER PUBLICATIONS

International Search Report issued in corresponding International Application No. PCT/JP2018/029290, dated Oct. 16, 2018 (2 pages).

(Continued)

*Primary Examiner* — Alexander Markoff
(74) *Attorney, Agent, or Firm* — Osha Bergman Watanabe & Burton LLP

(57) ABSTRACT

A foreign substance removing device includes: a cylinder including a support portion; a piston configured to send out a fluid flowing into the cylinder; a spring configured to urge the piston; and a mechanism configured to apply a moving force to the piston. A direction in which the fluid is sent out is a first direction. The piston is moved in the first direction by an urging force of the spring. An operation portion of the piston is formed with a convex or concave portion. The support portion is formed with an insertion concave portion into which the convex portion is capable of being inserted or an insertion convex portion capable of being inserted into the concave portion. A compression space is formed in the moving space when the piston is moved in the first direction (Continued)

and the convex portion or the insertion convex portion is inserted.

14 Claims, 21 Drawing Sheets

(51) Int. Cl.
| | | |
|---|---|---|
| B08B 3/02 | (2006.01) | |
| B60S 1/52 | (2006.01) | |
| B60S 1/60 | (2006.01) | |
| H04N 5/225 | (2006.01) | |

(58) Field of Classification Search
CPC ...... H04N 5/225; H04N 5/22521; F03G 1/02; F03G 1/10; F04B 35/01; F04B 39/121; F04B 39/00; G02B 27/0006
See application file for complete search history.

(56) References Cited

U.S. PATENT DOCUMENTS

| | | | | | |
|---|---|---|---|---|---|
| 6,113,006 | A * | 9/2000 | Walker | ...... | B60S 1/52 239/284.1 |
| 6,439,104 | B1 * | 8/2002 | Tonogai | ...... | F04B 35/01 74/29 |
| 6,464,150 | B1 * | 10/2002 | Zimmer | ...... | B60S 1/52 239/284.1 |
| 6,948,513 | B2 * | 9/2005 | Steerman | ...... | B60S 1/52 137/15.18 |
| 2002/0043152 | A1 * | 4/2002 | Migliori | ...... | F15B 15/223 91/394 |
| 2004/0250858 | A1 * | 12/2004 | Steerman | ...... | B60S 1/52 137/540 |
| 2008/0190988 | A1 * | 8/2008 | Pedicini | ...... | B25C 1/04 137/540 |
| 2014/0023537 | A1 * | 1/2014 | Wang | ...... | F04B 41/00 417/437 |
| 2016/0339875 | A1 * | 11/2016 | Ina | ...... | B60S 1/522 |
| 2017/0028968 | A1 * | 2/2017 | Kubota | ...... | F04B 39/0005 |
| 2017/0182980 | A1 * | 6/2017 | Davies | ...... | B05B 9/04 |
| 2017/0355353 | A1 * | 12/2017 | Kato | ...... | B60S 1/481 |
| 2019/0219043 | A1 * | 7/2019 | Kikuta | ...... | F04B 53/10 |
| 2019/0270432 | A1 * | 9/2019 | Ina | ...... | B60S 1/56 |

FOREIGN PATENT DOCUMENTS

| | | | | |
|---|---|---|---|---|
| JP | S51009157 A | 1/1976 | | |
| JP | 57204342 A | * 12/1982 | ...... | F16F 9/48 |
| JP | S57204342 A | 12/1982 | | |
| WO | 2015159763 A1 | 10/2015 | | |
| WO | 2016104050 A1 | 6/2016 | | |
| WO | WO-2016104050 A1 | * 6/2016 | ...... | H04N 5/225 |

OTHER PUBLICATIONS

Written Opinion of the International Searching Authority issued in corresponding International Application No. PCT/JP2018/029290, dated Oct. 16, 2018 (4 pages).

* cited by examiner

FOREIGN SUBSTANCE REMOVING DEVICE

TECHNICAL FIELD

The present invention relates to a technical field of a foreign substance removing device that cleans an object to be cleaned by ejecting a fluid from a nozzle.

BACKGROUND ART

A structure such as a vehicle is provided with various structure bodies, and among these structure bodies, it is desirable to remove foreign substances such as moisture, mud, and dust in order to ensure a good visibility for an in-vehicle camera, a vehicle lamp, and a rearview mirror, for example.

For example, although the in-vehicle camera is used as a device for displaying an image on a display in order to check the rear of the vehicle or check a position outside the vehicle that is difficult for a driver to see, an imaging portion may be contaminated by the mud spattered during traveling of the vehicle, and water droplets or the like adhering to the vehicle during the traveling in the rain or the like, so that the image displayed on the display may become blurred and the checking may be hindered.

In order to prevent such a problem, for example, there has been known a foreign substance removing device that removes foreign substances such as moisture, mud, dust, or the like adhering to an object to be cleaned by ejecting a fluid, for example, high-pressure air from a nozzle to the object to be cleaned such as an in-vehicle camera (for example, see Patent Literature 1).

In the foreign substance removing device described in Patent Literature 1, by moving a piston in a first direction in which the fluid is sent out with respect to the cylinder, for example, air is generated as high-pressure air, and the high-pressure air is ejected toward the object to be cleaned, so that the mud and the water droplets are blown away to eliminate contamination of the object to be cleaned.

The foreign substance removing device that eliminates the contamination of the imaging portion with the fluid such as the high-pressure air has advantages in that a liquid storage tank is not required and the ejected fluid does not remain in the imaging portion, as compared with a foreign substance removing device that ejects a high-pressure fluid such as water to eliminate the contamination.

CITATION LIST

Patent Literature

[Patent Literature 1]: WO 2015/159763

SUMMARY OF INVENTION

Technical Problem

However, in the foreign substance removing device described in Patent Literature 1, the piston is moved with respect to the cylinder at a high speed to generate the high-pressure fluid (high-pressure air), and an urging spring, for example, a compression coil spring is used to move the piston at a high speed. Accordingly, the piston is moved at the high speed by the compression of the compressed urging spring.

However, since the piston is moved by an urging force of the urging spring, a tip end surface of the piston may contact with an inner surface of the cylinder depending on the urging force of the urging spring or the like, and an operation noise due to the contact may be generated. There is a possibility that the operation sound is recognized as an abnormal noise by a user, for example, a driver or a passenger of a vehicle, and in this case, the driver or the passenger may feel uncomfortable, and vibration or the like may occur depending on a degree of contact.

An object of the present invention is to solve the above-described problems and to prevent contact between a piston and a cylinder when the piston is moved.

Solution to Problem

According to a first aspect of the present invention, there is provided a foreign substance removing device including:

a cylinder including a piston support portion of which an internal space is formed as a moving space;

a piston movably supported by the cylinder and configured to send out a fluid that has flowed into the cylinder;

a nozzle configured to eject the fluid sent out by the piston toward an object to be cleaned;

an urging spring configured to urge the piston; and a moving mechanism configured to apply a moving force to the piston, wherein a direction in which the fluid is sent out is a first direction of a moving direction of the piston, wherein the piston is moved in the first direction by an urging force of the urging spring, wherein the piston includes an operation portion that is moved in the moving space, wherein the operation portion is formed with a convex portion or a concave portion, wherein the piston support portion is formed with an insertion concave portion into which the convex portion is capable of being inserted or an insertion convex portion which is capable of being inserted into the concave portion, and wherein a compression space of the fluid is formed in the moving space in a state in which the piston is moved in the first direction and the convex portion or the insertion convex portion is inserted into the insertion concave portion or the concave portion.

As a result, when the piston is moved in the first direction, the convex portion or the insertion convex portion is inserted into the insertion concave portion or the concave portion, and the compression space of the fluid is formed in the moving space, so that an action of a damper caused by the compressed fluid is generated with respect to the piston.

In the foreign substance removing device according to a second aspect of the present invention, it is preferable that the convex portion or the insertion convex portion is formed into a tubular shape.

As a result, the convex portion or the insertion convex portion having the tubular shape is inserted into the insertion concave portion or the concave portion, and airtightness of the compression space is increased.

In the foreign substance removing device according to a third aspect of the present invention, it is preferable that the operation portion is formed with the concave portion, and the piston support portion is formed with the insertion convex portion.

As a result, it is possible to reduce a size of the piston support portion in the moving direction of the piston.

In the foreign substance removing device according to a fourth aspect of the present invention, it is preferable that the concave portion is formed into an annular shape, the insertion convex portion is formed into a tubular shape, and a portion on an inner side of the concave portion of the piston is provided as an insertion portion to be inserted into an inner side of the insertion convex portion.

As a result, when the piston is moved toward the first direction side, the insertion convex portion of the cylinder is inserted into the concave portion of the piston, and the insertion portion is inserted into the inner side of the insertion convex portion.

In the foreign substance removing device according to a fifth aspect of the present invention, it is preferable that a seal ring is attached to an outer peripheral portion of the insertion portion or an inner peripheral portion of the insertion convex portion.

As a result, when the insertion portion is inserted into the inner side of the insertion convex portion, the insertion portion and the insertion convex portion are sealed by the seal ring.

In the foreign substance removing device according to a sixth aspect of the present invention, it is preferable that a seal member that slides on an inner peripheral surface of the cylinder when the piston is moved is attached to an outer peripheral portion of the operation portion.

As a result, the piston and the cylinder are sealed by the seal member when the piston is moved.

According to a seventh aspect of the present invention, there is provided a foreign substance removing device including:

a cylinder into which a fluid flows; a piston movably supported by the cylinder and configured to send out the fluid that has flowed into the cylinder;

a seal member attached to the piston and slid on an inner peripheral surface of the cylinder when the piston is moved;

a nozzle configured to eject the fluid sent out by the piston toward an object to be cleaned;

an urging spring configured to urge the piston; and a moving mechanism configured to apply a moving force to the piston, wherein a direction in which the fluid is sent out is a first direction of a moving direction of the piston, wherein the piston is moved in the first direction by an urging force of the urging spring, and wherein an inclined portion whose diameter decreases as it goes in the first direction is formed as a part of an inner peripheral surface of the cylinder.

As a result, a frictional force between the inner peripheral surface of the cylinder and the seal member is increased by the inclined portion.

In the foreign substance removing device according to an eighth aspect of the present invention, it is preferable that a large-diameter portion having a constant diameter is formed as a part of the inner peripheral surface of the cylinder, a small-diameter portion having a constant diameter is formed as a part of the inner peripheral surface of the cylinder, and the inclined portion is positioned between the large-diameter portion and the small-diameter portion.

As a result, the pressure applied from the large-diameter portion and the small-diameter portion to the seal member is constant, and a large frictional force is generated between the small-diameter portion and the seal member.

In the foreign substance removing device according to a ninth aspect of the present invention, it is preferable that the cylinder is formed with a stopper surface that is capable of contacting a tip end surface of the piston when the piston is moved in the first direction, and the inclined portion is formed to be continuous with the stopper surface.

As a result, there is no other surface between the inclined portion and the stopper surface.

In the foreign substance removing device according to a tenth aspect of the present invention, it is preferable that the cylinder includes a piston support portion supporting the piston and a connecting protrusion portion continuous with the piston support portion, the connecting protrusion portion is formed into a tubular shape, the fluid is sent out from the connecting protrusion portion, and an axial direction of the connecting protrusion portion coincides with the moving direction of the piston.

As a result, the fluid is sent out from the connecting protrusion portion whose axial direction coincides with the moving direction of the piston.

In the foreign substance removing device according to an eleventh aspect of the present invention, it is preferable that the cylinder includes a piston support portion supporting the piston and a connecting protrusion portion continuous with the piston support portion, the connecting protrusion portion is formed into a tubular shape, the fluid is sent out from the connecting protrusion portion, and an axial direction of the connecting protrusion portion is a direction orthogonal to the moving direction of the piston.

As a result, the axial direction of the connecting protrusion portion and the moving direction of the piston are orthogonal to each other.

According to a twelfth aspect of the present invention, there is provided a foreign substance removing device including:

a cylinder into which a fluid flows;

a piston movably supported by the cylinder and configured to send out the fluid that has flowed into the cylinder;

an elastically deformable annular seal member attached to an outer peripheral portion of the piston and slidable on an inner peripheral surface of the cylinder when the piston is moved;

a nozzle configured to eject the fluid sent out by the piston toward an object to be cleaned; and a moving mechanism configured to apply a moving force to the piston, wherein a direction in which the fluid is sent out is a first direction of a moving direction of the piston, and a direction opposite to the first direction is a second direction of the moving direction of the piston, wherein a check valve configured to regulate flow of the fluid toward a second direction side is arranged in a flow path of the fluid in a first direction side of the piston, wherein the seal member is formed with a groove portion opened in the first direction, and wherein when the piston is moved, the seal member is elastically deformed or elastically restored by a difference of internal pressure in spaces on opposite sides of the cylinder, the seal member being sandwiched between the spaces.

As a result, when the piston is moved in the first direction, the seal member is pressed against and slid on the inner peripheral surface of the cylinder by the pressure in the direction in which the groove portion expands, whereas when the piston is moved in the second direction, the seal member is elastically deformed by the pressure in the direction in which the groove portion is narrowed so as to form the gap between the seal member and the inner peripheral surface of the cylinder.

In the foreign substance removing device according to a thirteenth aspect of the present invention, it is preferable that at least a part of the groove portion is positioned outside an outer peripheral surface of the piston.

As a result, when the piston is moved in the first direction, the air easily enters the groove portion, the pressure in the direction in which the groove portion expands is applied to the seal member, and the seal member is easily pressed against the inner peripheral surface of the cylinder.

In the foreign substance removing device according to a fourteenth aspect of the present invention, it is preferable that the cylinder includes a piston support portion supporting the piston and a connecting protrusion portion continuous with the piston support portion, the connecting protrusion portion is formed into a tubular shape, the fluid is sent out from the connecting protrusion portion, a pipe is connected to the connecting protrusion portion, and the check valve is arranged in the pipe.

As a result, the check valve is arranged in the pipe connecting the nozzle and the cylinder.

In the foreign substance removing device according to a fifteenth aspect of the present invention, it is preferable that the cylinder includes a piston support portion supporting the piston and a connecting protrusion portion continuous with the piston support portion, the connecting protrusion portion is formed into a tubular shape, the fluid is sent out from the connecting protrusion portion, and the check valve is arranged in the connecting protrusion portion.

As a result, since the check valve is arranged in a part of the cylinder, a dedicated member for arranging the check valve is not required.

In the foreign substance removing device according to a sixteenth aspect of the present invention, it is preferable that an axial direction of the connecting protrusion portion coincides with the moving direction of the piston.

As a result, the air is sent out from the connecting protrusion portion whose axial direction coincides with the moving direction of the piston.

Advantageous Effects of Invention

According to the present invention, when the piston is moved in the first direction, the convex portion or the insertion convex portion is inserted into the insertion concave portion or the concave portion to form the compression space of the fluid in the moving space, an action of a damper caused by the compressed fluid is generated with respect to the piston, so that it is possible to prevent contact between the piston and the cylinder when the piston is moved.

DESCRIPTION OF EMBODIMENTS

Figure 1:
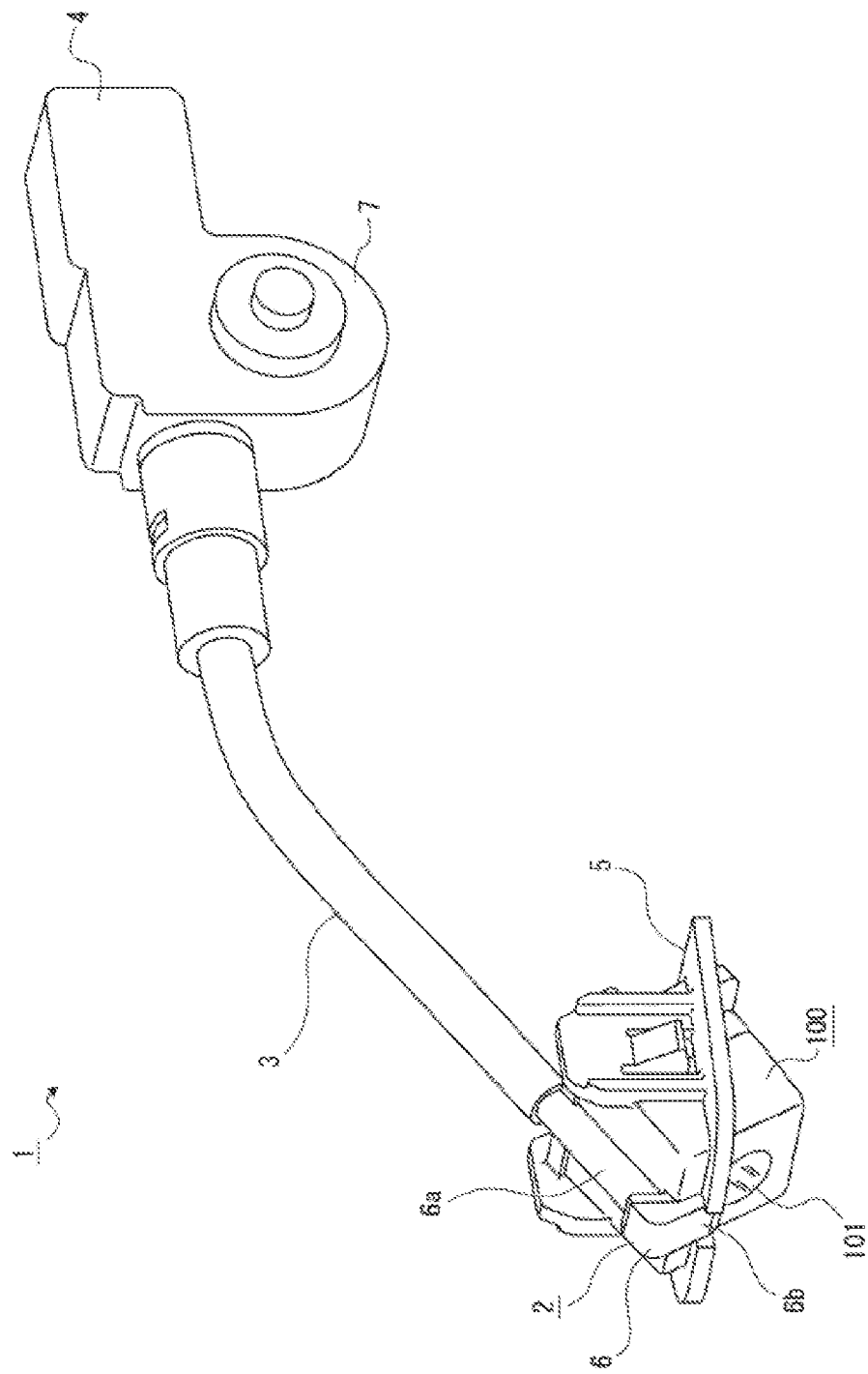
FIG. 1 together with FIGS. 2 to 27 shows a foreign substance removing device according to an embodiment of the present invention together, and is a perspective view of a foreign substance removing device.

Hereinafter, embodiments of the present invention will be described with reference to the accompanying drawings. Hereinafter, a first embodiment, a second embodiment, and a third embodiment of a foreign substance removing device will be described with reference to the accompanying drawings. FIGS. 1 and 3 show a common configuration of the first embodiment, the second embodiment, and the third embodiment. FIGS. 2 and 4 to 13 show the first embodiment, FIGS. 14 to 20 show the second embodiment, FIGS. 21 to 27 show the third embodiment.

In the following, an example in which the foreign substance removing device according to the present invention is applied to a device that removes foreign substances adhering to an in-vehicle camera will be described. However, application of the foreign substance removing device according to the present invention is not limited to the device that removes the foreign substances adhering to the in-vehicle camera, the foreign substance removing device can be widely applied as a device that removes the foreign substances adhering to various structures, and in particular, a foreign substance removing device that removes the foreign substances adhering to a structure body such as a vehicle lamp, a window, a mirror, and a collision prevention sensor provided on a vehicle.

The foreign substance removing device shown below includes a cylinder, a piston, and a nozzle, and ejects high-pressure air as a fluid from the nozzle by moving the piston with respect to the cylinder. However, the fluid ejected from the nozzle is not limited to the high-pressure air, and may be a fluid in which a gas and a liquid are mixed in addition to other gases and liquids.

In the following description, a direction in which the piston is moved is assumed to an front-rear direction, and front, rear, upper, lower, left, and right directions are indicated. Incidentally, the front, rear, upper, lower, left, and right directions shown below are for convenience of description, and embodiments of the present invention are not limited to these directions.

First, a foreign substance removing device according to the first embodiment will be described (see FIGS. 1 to 13).

Configuration of Foreign Substance Removing Device According to First Embodiment The foreign substance removing device 1 has a function of, for example, cleaning an in-vehicle camera 100 that checks the rear of the vehicle, and is attached to a portion of a vehicle body (not shown) on a rear end side.

The foreign substance removing device 1 includes a nozzle unit 2, a pipe 3, and a high-pressure air generating unit 4 (see FIG. 1).

The nozzle unit 2 includes an attaching bracket 5 and a nozzle 6. The attaching bracket 5 is attached to a rear end portion of the vehicle body. The nozzle 6 includes a cylindrical flow portion 6a extending in a front-rear direction and an ejection portion 6b continuous to a rear end of the flow portion 6a, and is formed integrally with the attaching bracket 5, for example.

The nozzle unit 2 is formed integrally with an in-vehicle camera 100, for example. The in-vehicle camera 100 includes an imaging portion, and a rear end portion of the imaging portion is a lens portion 101. Therefore, the in-vehicle camera 100 takes an image of a subject via the lens portion 101.

As described above, in the foreign substance removing device 1, since the nozzle 6 is integrally formed with the in-vehicle camera 100, the nozzle 6 and the in-vehicle camera 100 are assembled to the vehicle body at the same time in a single operation, so that an assembly operation to the vehicle body can be performed easily and quickly, and a workability can be improved.

The pipe 3 is a hose made of resin or rubber, for example, and a front end portion thereof is connected to one end portion of the cylinder, which will be described later, of the high-pressure air generating unit 4, and a rear end portion thereof is connected to a front end portion of the flow portion 6a in the nozzle 6.

Figure 2:
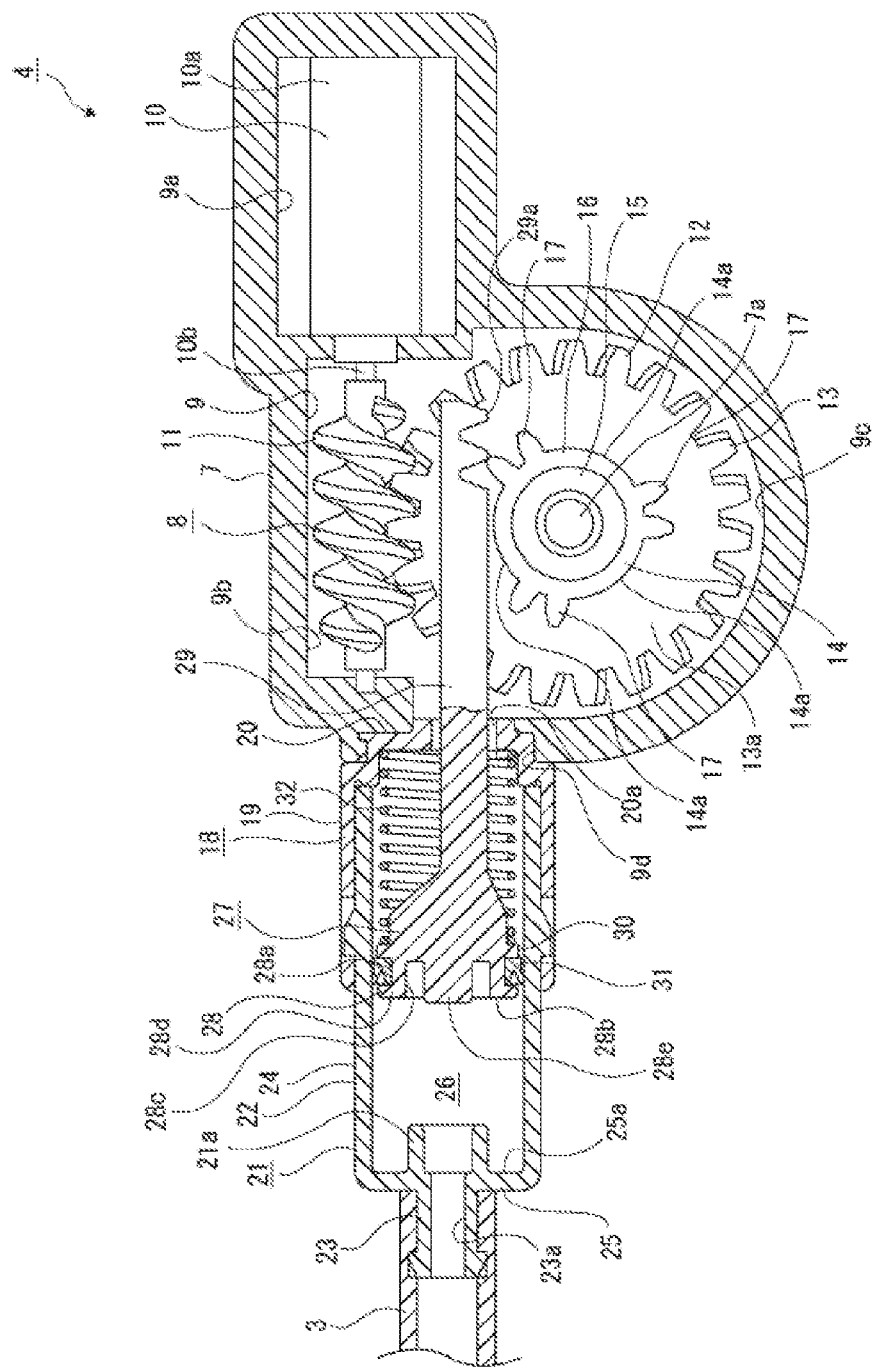
FIG. 2 together with FIGS. 3 to 13 shows a first embodiment, and is a sectional view showing an internal structure of a high-pressure air generating unit.
Figure 3:
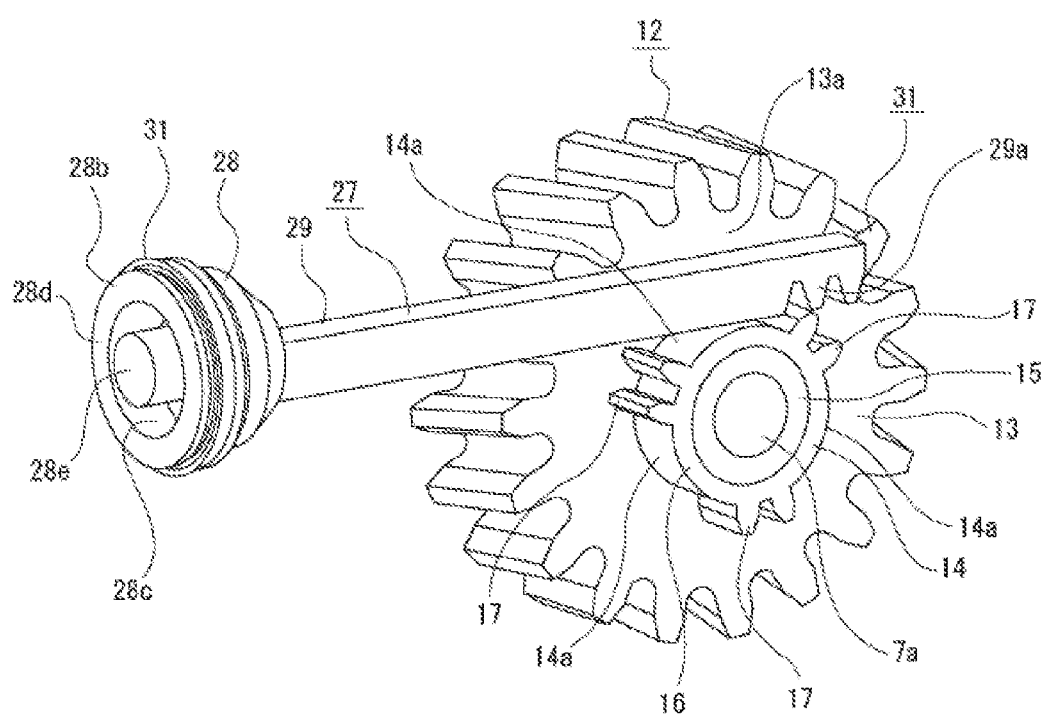
FIG. 3 is an enlarged perspective view showing a worm wheel, a piston, and a rack.

The high-pressure air generating unit 4 includes a case body 7 and a moving mechanism 8 arranged inside the case body 7 (see FIG. 2). The high-pressure air generating unit 4 is attached to a part of the vehicle body inside the vehicle.

An inner portion of the case body 7 is formed as an arrangement space 9, and the arrangement space 9 includes a motor arrangement portion 9a, a worm arrangement portion 9b, and a gear arrangement portion 9c. The motor arrangement portion 9a and the worm arrangement portion 9b are positioned in communication with each other in the front-rear direction, and the worm arrangement portion 9b and the gear arrangement portion 9c are positioned in communication with each other in an upper-lower direction. A rear end portion of the case body 7 is formed with a coupling hole 9d penetrating in the front-rear direction. The coupling hole 9d communicates an outer portion of the case body 7 and the gear arrangement portion 9c.

The case body 7 includes a support shaft portion 7a protruding laterally, and the support shaft portion 7a is positioned in the gear arrangement portion 9c.

The moving mechanism 8 includes a driving motor 10, a worm 11, and a worm wheel 12.

The driving motor 10 has a main body portion 10a and a motor shaft 10b, and the main body portion 10a is arranged in the motor arrangement portion 9a.

The worm 11 is connected to the motor shaft 10b and is arranged in the worm arrangement portion 9b.

The worm wheel 12 is formed integrally with a helical gear 13 and a pinion 14 protruding laterally from a central portion of the helical gear 13 (see FIGS. 2 and 3). The worm wheel 12 is arranged in the gear arrangement portion 9c, and a central portion thereof is supported by the support shaft portion 7a of the case body 7 via a bearing 15.

The helical gear 13 is meshed with the worm 11.

The pinion 14 is coaxial with the helical gear 13, and includes an annular portion 16 externally supported by the bearing 15 and gear portions 17, 17, and 17 provided on an outer peripheral side of the annular portion 16. The gear portions 17, 17, and 17 are provided at equal intervals in a peripheral direction. Each of the gear portions 17 includes, for example, two gear teeth.

A diameter of an addendum circle of the pinion 14 is smaller than a diameter of a root circle of the helical gear 13. Therefore, the helical gear 13 is formed with a side surface 13a positioned on an outer peripheral side of the pinion 14 on a side where the pinion 14 is positioned. Portions of the pinion 14 between the gear portions 17, 17, and 17 are formed as tooth missing portions 14a, 14a, and 14a, respectively. For example, three tooth missing portions 14a are formed at equal intervals in the peripheral direction.

As described above, the worm wheel 12 is formed integrally with the helical gear 13 and the pinion 14. Therefore, the number of components can be reduced, and a driving force transmitted from the driving motor 10 to the helical gear 13 can be efficiently transmitted to the pinion 14, so that the driving motor 10 can be reduced in a size.

A receiving holder 18 is coupled to a rear end portion of the case body 7. The receiving holder 18 includes a substantially cylindrical holding portion 19 whose axial direction is the front-rear direction, and a receiving portion 20 projecting inward from a front end portion of the holding portion 19, and is coupled to the case body 7 in a state in which the receiving portion 20 is inserted into the coupling hole 9d. A space on an inner peripheral side of the receiving portion 20 is formed as an insertion hole 20a.

A cylinder 21 is attached to the receiving holder 18 in a state in which the cylinder 21 is held. The cylinder 21 is attached to the receiving holder 18 in a state of being fitted to an inner side of the receiving holder 18 except for a part thereof.

The cylinder 21 includes a piston support portion 22 and a connecting protrusion portion 23 protruding rearward from the piston support portion 22, and a diameter of the piston support portion 22 is larger than a diameter of the connecting protrusion portion 23.

The piston support portion 22 includes a tubular portion 24 having a substantially cylindrical shape extending forward and rearward, and a blocking portion 25 that blocks an opening on a rear side of the tubular portion 24. A space inside the piston support portion 22 is formed as a moving space 26 in which the cylinder 21 is moved. An inner surface of the blocking portion 25 is formed as a stopper surface 25a.

The connecting protrusion portion 23 protrudes rearward from a central portion of the blocking portion 25, and an internal space thereof is formed as a sending-out path 23a in which high-pressure air is sent toward the nozzle 6. The connecting protrusion portion 23 is formed into a cylindrical shape, and the sending-out path 23a communicates with the moving space 26 of the piston support portion 22. A front end portion of the pipe 3 is connected to the connecting protrusion portion 23.

Figure 4:
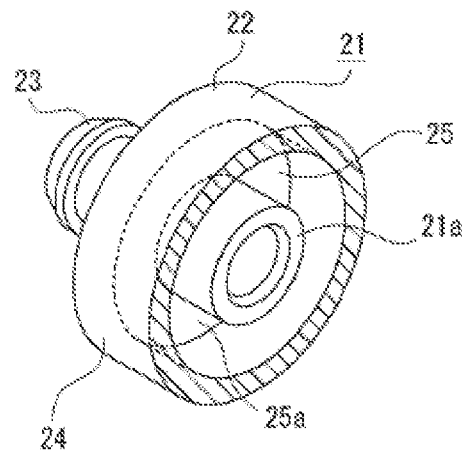
FIG. 4 is a perspective view showing an insertion convex portion or the like provided on a cylinder.

The cylinder 21 includes an insertion convex portion 21a protruding forward from the central portion of the blocking portion 25 (see FIGS. 2 and 4). The insertion convex portion 21a protrudes forward from a front opening edge of the sending-out path 23a, and is formed into a tubular shape, for example, a cylindrical shape.

Figure 5:
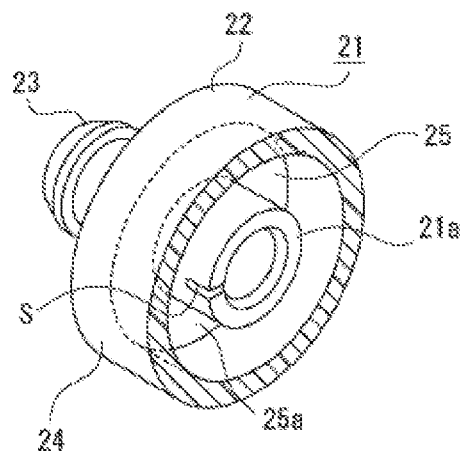
FIG. 5 is a perspective view showing the insertion convex portion or the like provided on the cylinder and formed with one slit.
Figure 6:
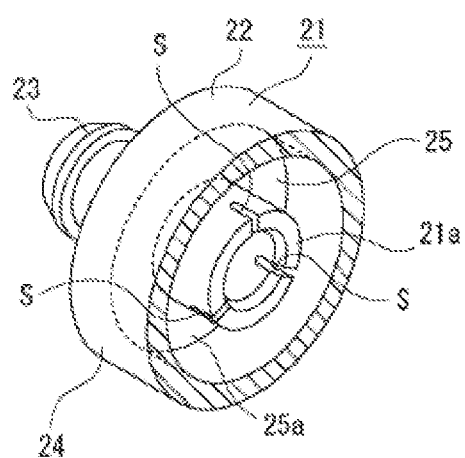
FIG. 6 is a perspective view showing the insertion convex portion or the like provided on the cylinder and formed with a plurality of slits.

Incidentally, the insertion convex portion 21a is not limited to the tubular shape, and may be formed, for example, in a substantially tubular shape having one or a plurality of slits S (see FIGS. 5 and 6). In addition, the insertion convex portion 21a may have a shape having a hole, a notch, or the like instead of the slit S.

A piston 27 is movably supported by the piston support portion 22 of the cylinder 21 (see FIG. 2). The piston 27 is reciprocated in the front-rear direction with respect to the cylinder 21.

The piston 27 includes an operation portion 28 provided as a rear end portion and a connecting portion 29 protruding substantially forward from a substantially central portion of the operation portion 28, and the operation portion 28 is formed with an annular arrangement groove 28a that opens outward. A tip end surface 28b of the operation portion 28 is positioned to face the stopper surface 25a of the cylinder 21. An outer diameter of the operation portion 28 is slightly smaller than the diameter of an inner peripheral surface of the piston support portion 22. Therefore, a gap 30 is formed between an outer peripheral surface of the operation portion 28 and an inner peripheral surface of the piston support portion 22.

A concave portion 28c opened rearward is formed in the operation portion 28 (see FIGS. 2 and 3). The concave portion 28c is formed into an annular shape. In the operation portion 28, a portion on an outer side of the concave portion 28c is provided as an outer annular portion 28d, and a portion on an inner side of the concave portion 28c is provided as an insertion portion 28e.

A seal member 31 is attached to the operation portion 28 in a state of being inserted into the arrangement groove 28a. The seal member 31 is formed of an elastically deformable material, for example, rubber or resin, and an outer peripheral portion thereof protrudes outward from the outer peripheral surface of the operation portion 28.

A rack portion 29a is formed at a front end portion of the connecting portion 29 of the piston 27. The connecting portion 29 is inserted through the insertion hole 20a formed in the receiving holder 18, and the rack portion 29a can mesh with the gear portion 17 of the pinion 14 of the worm wheel 12.

An urging spring 32 is arranged at the inner side of the piston support portion 22 of the cylinder 21. The urging spring 32 is, for example, a compression coil spring, and is compressed between the operation portion 28 of the piston 27 and the receiving portion 20 of the receiving holder 18. Further, the piston 27 is urged rearward by the urging spring 32.

For a moving direction of the piston 27, the front, which is a direction of sending out the air, is a first direction, and the rear, which is a direction opposite to the first direction, is a second direction. The second direction is a direction in which the piston 27 is moved against an urging force of the urging spring 32, and a moving force in the first direction applied to the piston 27 is increased by the urging force of the urging spring 32 as the piston 27 is moved in the second direction.

Operation of Foreign Substance Removing Device According to First Embodiment

Figure 7:
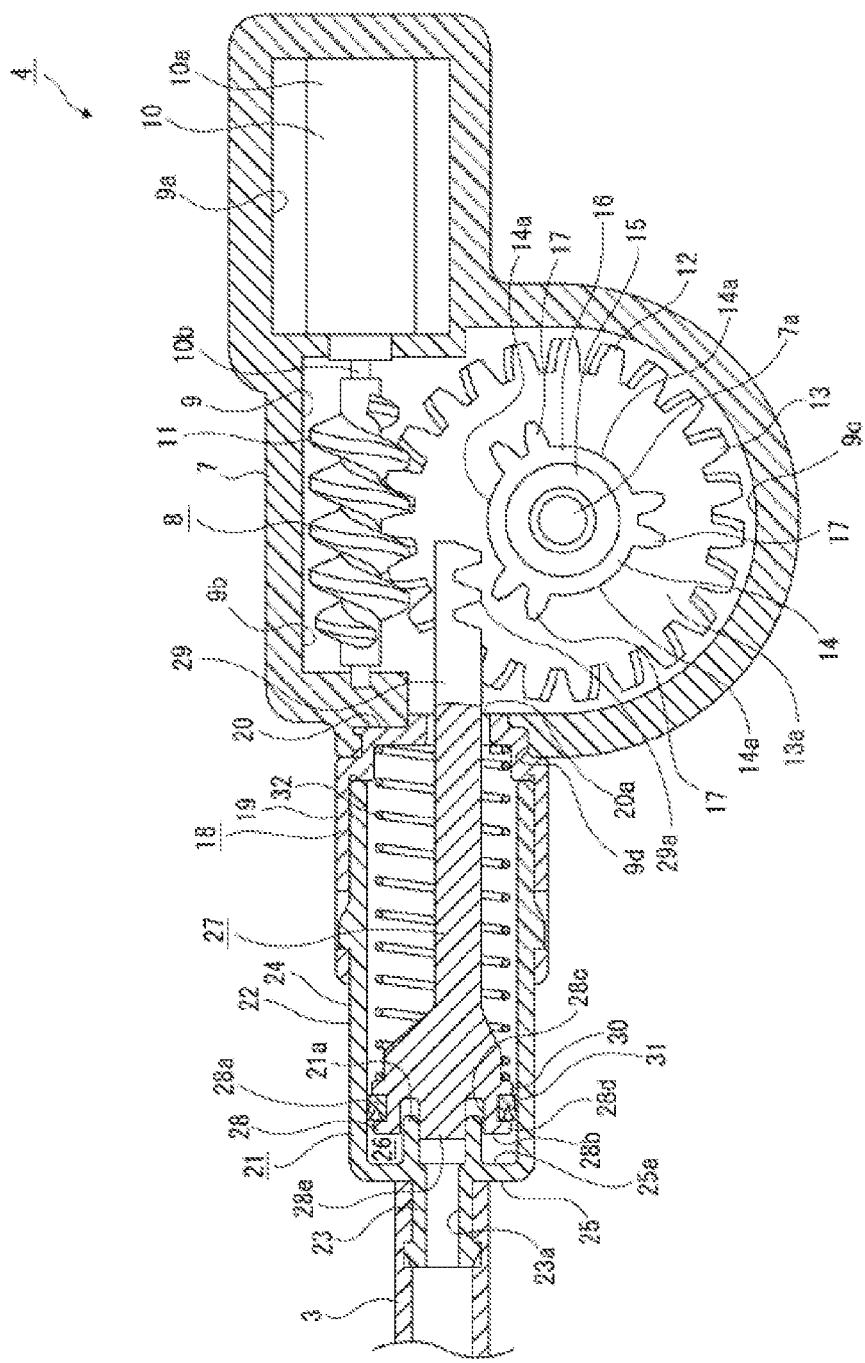
FIG. 7 is a sectional view showing an initial state when the piston is moved in a first direction.

An operation of the foreign substance removing device 1 will be described below (see FIGS. 7 to 9).

First, an initial state before the high-pressure air is sent out will be described (see FIG. 7).

In the initial state, the piston 27 is positioned on a rear side in the moving direction, and the piston 27 is positioned in a state in which the rack portion 29a can mesh with the gear portions 17, 17, and 17 of the pinion 14. At this time, the piston 27 is in a state in which the seal member 31 attached to the operation portion 28 is in contact with the inner peripheral surface of the piston support portion 22 in the cylinder 21.

Figure 8:
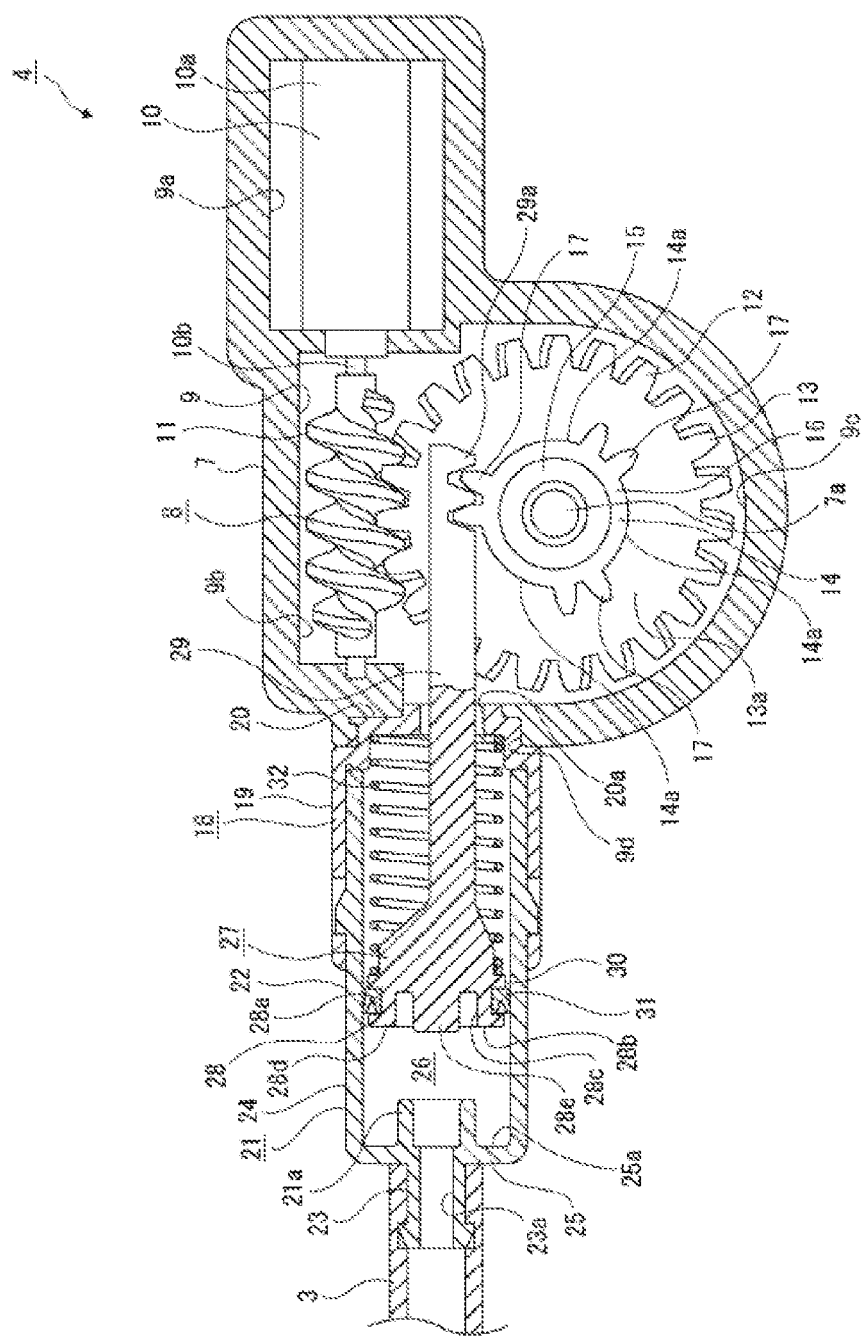
FIG. 8 is a sectional view showing a state in which the piston is moved in a second direction.

When the driving of the driving motor 10 is started in the initial state and the driving force of the driving motor 10 is transmitted to the worm wheel 12 via the worm 11, the gear portion 17 of the pinion 14 is meshed with the rack portion 29a of the piston 27 (see FIG. 8). Accordingly, the piston 27 is moved in the second direction against the urging force of the urging spring 32 along with rotation of the pinion 14.

When the piston 27 is moved in the second direction, air outside the foreign substance removing device 1 is taken into the moving space 26 through, for example, the nozzle 6, the pipe 3, and the connecting protrusion portion 23 of the cylinder 21.

When the piston 27 is moved in the second direction along with the rotation of the pinion 14, the meshing between the gear portion 17 and the rack portion 29a is released at a predetermined position.

When the meshing between the gear portion 17 and the rack portion 29a is released, the piston 27 is moved in the first direction at a higher speed than a moving speed in the second direction by the urging force of the urging spring 32, and the air in the moving space 26 passes through the sending-out path 23a of the connecting protrusion portion 23 and is sent toward the nozzle 6 via the pipe 3. At this time, since a diameter of the connecting protrusion portion 23 is smaller than a diameter of the piston support portion 22 in the cylinder 21, the air sent out from the moving space 26 through the sending-out path 23a is compressed to become high-pressure air, and sent out from the pipe 3 toward the nozzle 6, so that the high-pressure air is ejected from the nozzle 6 and blown to the lens portion 101 of the imaging portion in the in-vehicle camera 100.

When the high-pressure air ejected from the nozzle 6 is blown to the lens portion 101, foreign substances such as dust, mud, and water droplets adhering to the lens portion 101 are blown off, and the lens portion 101 is cleaned to eliminate contamination.

Figure 9:
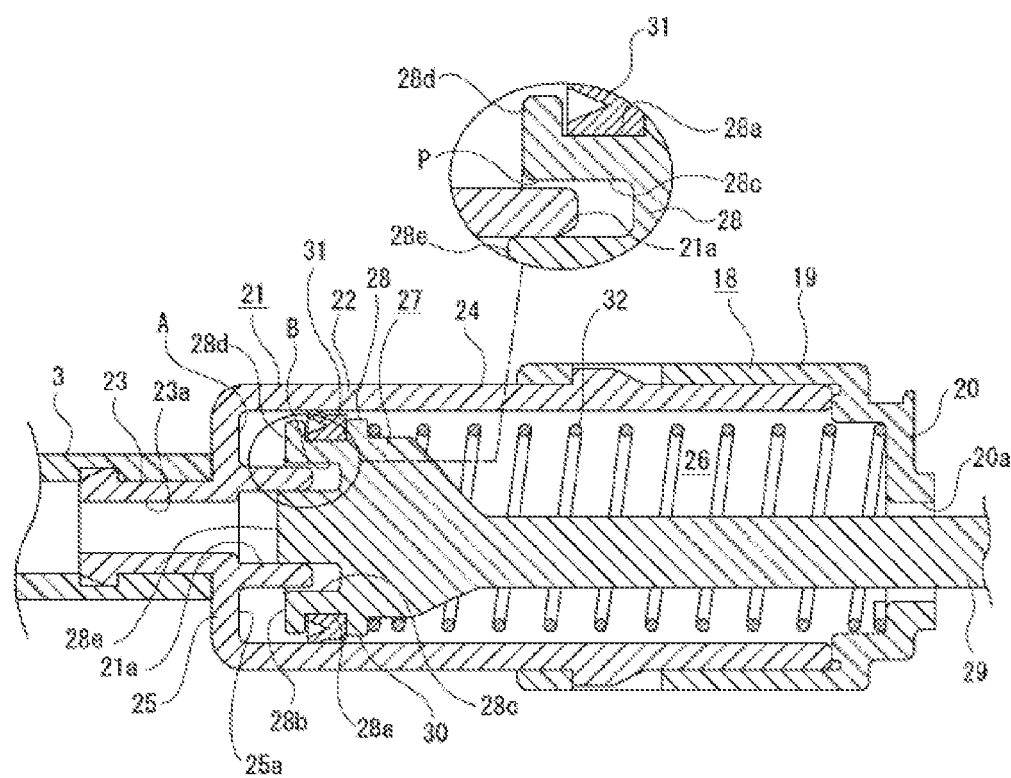
FIG. 9 is an enlarged sectional view showing a state in which the piston is moved in the first direction.

When the piston 27 is moved in the first direction by the urging force of the urging spring 32, and the high-pressure air is sent out, the insertion convex portion 21a of the cylinder 21 is inserted into the concave portion 28c of the piston 27, and the insertion portion 28e of the piston 27 is inserted into the inside of the insertion convex portion 21a (see FIG. 9).

When the insertion convex portion 21a is inserted into the concave portion 28c and the insertion portion 28e is inserted into the inside of the insertion convex portion 21a, for example, an outer peripheral surface of the insertion portion 28e is in contact with an inner peripheral surface of the insertion convex portion 21a, and a constant gap P is formed between an outer peripheral surface of the insertion convex portion 21a and the outer annular portion 28d. At this time, since the seal member 31 attached to the piston 27 is brought into close contact with an inner peripheral surface of the cylinder 21, and the outer peripheral surface of the insertion portion 28e is in contact with the inner peripheral surface of the insertion convex portion 21a, air is compressed in a space A on an outer peripheral side of the insertion convex portion 21a and a space B in which the insertion convex portion 21a has not been inserted into the concave portion 28c in the moving space 26, and the compressed air functions as an air damper.

Therefore, by the air that functions as the air damper remaining in the space A and the space B formed as a compression space, pressure that prevents the piston 27 from moving in the first direction is applied to the piston 27, and the piston 27 is decelerated.

Since the piston 27 is decelerated by the insertion of the insertion convex portion 21a into the concave portion 28c as described above, the piston 27 is stopped before the tip end surface 28b of the operation portion 28 contacts with the stopper surface 25a of the blocking portion 25 in the cylinder 21, so that the tip end surface 28b does not contact with the stopper surface 25a.

The reciprocating motion of the piston 27 described above is performed as one cycle by the meshing and releasing of the meshing between the gear portion 17 of the pinion 14 and the rack portion 29a of the piston 27, and the piston 27 is moved in the first direction due to the tooth missing portion 14a of the pinion 14.

Since the piston 27 is moved in the first direction due to the tooth missing portion 14a, it is not necessary to provide a dedicated mechanism for moving the piston 27 in the first direction, so that the foreign substance removing device 1 can be reduced in a size by simplifying a mechanism.

Since the foreign substance removing device 1 includes the gear portions 17, 17, and 17 at three positions apart from each other in the peripheral direction of the pinion 14, and the three tooth missing tooth portions 14a, 14a, and 14a are formed, the reciprocating motion of the piston 27 is performed three times (three cycles) in one rotation of the pinion 14.

Therefore, the number of ejection times of the high-pressure air from the nozzle 6 with respect to one rotation of the pinion 14 is large, and ejection efficiency in the foreign substance removing device 1 can be improved. Incidentally, the number of the gear portions 17 of the pinion 14 is not limited to three, and may be one or two, or four or more.

Summary of First Embodiment

As described above, in the foreign substance removing device 1, the concave portion 28c is formed on the operation portion 28 of the piston 27, the insertion convex portion 21a is provided at the end portion on the first direction side of the piston support portion 22 of the cylinder 21, and a compression space of air is formed in the moving space 26 in a state in which the insertion convex portion 21a is inserted into the concave portion 28c.

Since an action of the damper caused by the compressed air is generated with respect to the piston 27, it is possible to prevent contact between the tip end surface 28b of the piston 27 and the blocking surface 25a of the cylinder 21 when the piston 27 is moved.

In addition, since generation of abnormal noise and generation of vibration can be prevented, it is also possible to prevent a driver or a passenger from feeling uncomfortable.

Since the insertion convex portion 21a is formed into the tubular shape, the tubular insertion convex portion 21a is inserted into the concave portion 28c, so that airtightness of the compression space can be increased, and the action of the damper can be efficiently applied to the piston 27.

Further, the portion of the piston 27 on the inner side of the concave portion 28c is provided as the insertion portion 28e to be inserted into the inside of the insertion convex portion 21a.

Therefore, when the piston 27 is moved toward the first direction side, since the insertion convex portion 21a of the cylinder 21 is inserted into the concave portion 28c of the piston 27 and the insertion portion 28e is inserted into the inside of the insertion convex portion 21a, the space A on the outer peripheral side of the insertion convex portion 21a and the space B in the concave portion 28c are both formed as the compression spaces, and an amount of the compressed air can be increased to efficiently prevent the piston 27 from contacting the cylinder 21.

Figure 10:
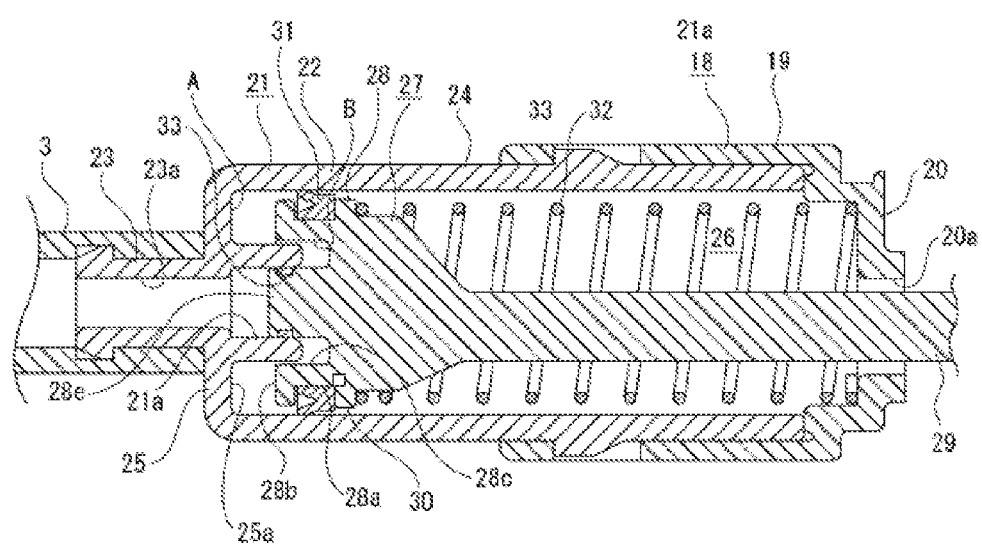
FIG. 10 is an enlarged sectional view showing a configuration in which a seal ring is attached to an insertion portion.

A seal ring 33 made of rubber or resin, for example, may be attached to an outer peripheral portion of the insertion portion 28e of the piston 27 (see FIG. 10).

By attaching the seal ring 33 to the insertion portion 28e, since the insertion portion 28e and the insertion convex portion 21a are sealed by the seal ring 33 when the insertion portion 28e is inserted into the inside of the insertion convex portion 21a, the airtightness of the compression space can be improved, and the action of the damper can be efficiently applied to the piston 27.

The seal ring 33 is attached to an inner peripheral portion of the insertion convex portion 21a, and when the insertion portion 28e is inserted into the inside of the insertion convex portion 21a, the insertion portion 28e and the insertion convex portion 21a can also be sealed by the seal ring 33.

Since the seal member 31 that slides on the inner peripheral surface of the cylinder 21 is attached to the outer peripheral portion of the operation portion 28, the piston 27 and the cylinder 21 are sealed by the seal member 31 when the piston 27 is moved, so that the airtightness of the compression space can be improved, and the action of the damper can be efficiently applied to the piston 27.

Others (First Embodiment)

Figure 11:
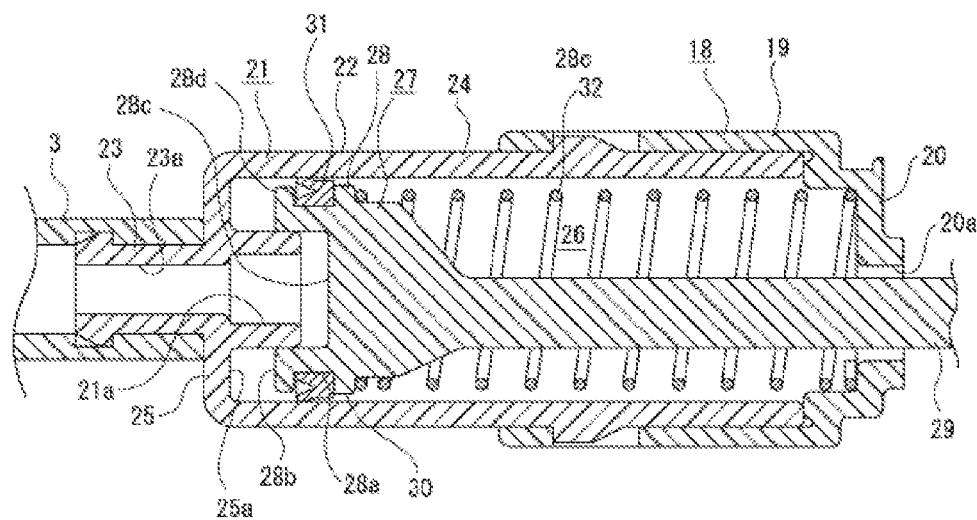
FIG. 11 is an enlarged sectional view showing a configuration in which the insertion portion is not provided on the piston.
Figure 12:
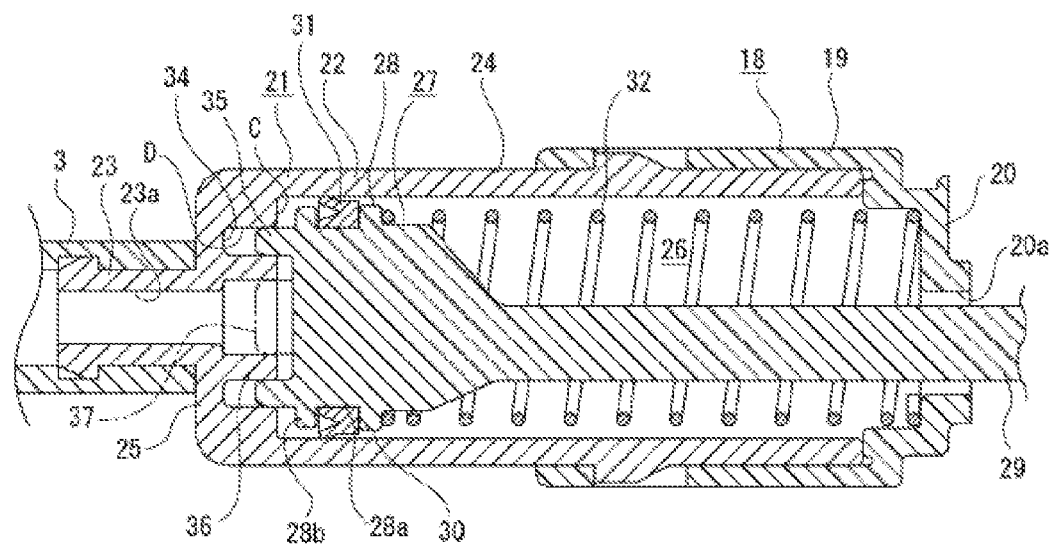
FIG. 12 is an enlarged sectional view showing a configuration in which an insertion concave portion is formed on the cylinder and a convex portion is provided on the piston.
Figure 13:
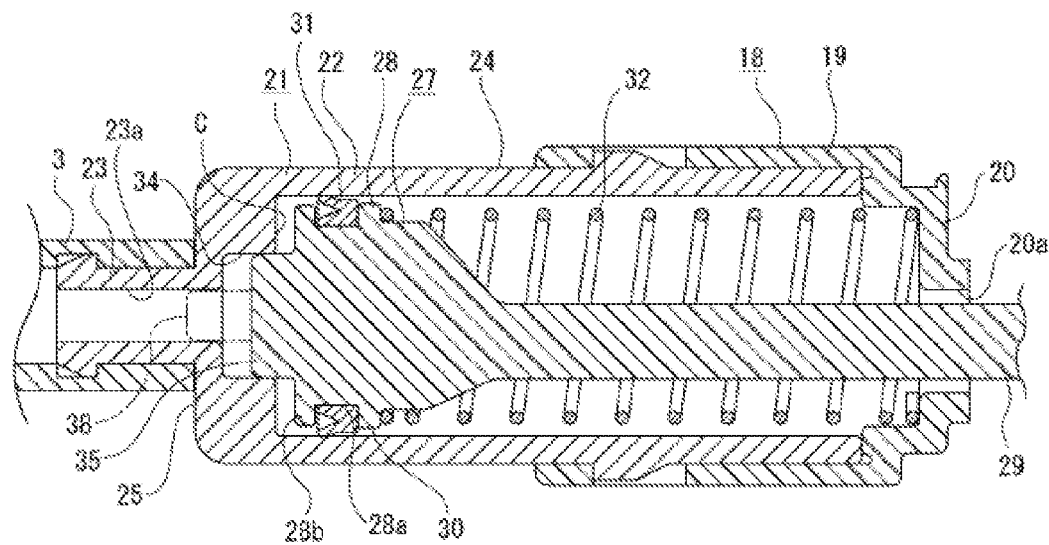
FIG. 13 is an enlarged sectional view showing another configuration in which the insertion concave portion is formed on the cylinder and the convex portion is provided on the piston.

Although an example is shown in which the annular concave portion 28c is formed on the cylinder 21 and the portion on the inner side of the concave portion 28c is provided as the insertion portion 28e as described above, the entire space on an inner side of the outer annular portion 28d may be formed as the concave portion 28c, and the piston 27 may not be provided with the insertion portion 28e, for example (see FIG. 11). In this case, the inner peripheral surface of the outer annular portion 28d and the outer peripheral surface of the insertion convex portion 21a need to be in contact with each other in a state in which the insertion convex portion 21a is inserted into the concave portion 28c.

In a case where the entire space on the inner side of the outer annular portion 28d is formed as the concave portion 28c, it is desirable that the seal ring 33 is attached to the inner peripheral portion of the outer annular portion 28d or the outer peripheral portion of the insertion convex portion 21a, and the outer annular portion 28d and the insertion convex portion 21a are sealed by the seal ring 33.

As described above, an example is shown in which the insertion convex portion 21a is provided on the cylinder 21, and the concave portion 28c is formed on the piston 27 as described above. Conversely, an insertion concave portion 34 is formed in the cylinder 21, a convex portion 35 is provided on the piston 27, and the convex portion 35 can be inserted into the insertion concave portion 34 when the piston 27 is moved in the first direction (see FIGS. 12 and 13). In this case, the insertion concave portion 34 may be formed into an annular shape, and an inner wall portion 36 may be provided inside the insertion concave portion 34 (see FIG. 12). The insertion concave portion 34 may be formed in a central portion of the blocking portion 25 (see FIG. 13).

Similarly to the insertion convex portion 21a, the convex portion 35 may be formed into a substantially tubular shape having one or a plurality of slits S, or may have a shape having a hole, a notch, or the like instead of the slit S.

In a case where the inner wall portion 36 is provided and the convex portion 35 is inserted into the insertion concave portion 34 (see FIG. 12), the air is compressed in a space C on an outer peripheral side of the convex portion 35 and a space D in which the convex portion 35 has not been inserted into the insertion concave portion 34, the compressed air functions as the air damper. Since the air remaining in the space C and the space D formed as compression spaces functions as the air damper, the pressure that prevents the piston 27 from moving in the first direction is applied to the piston 27, and the piston 27 is decelerated.

On the other hand, in a case where the inner wall portion 36 is not provided and the convex portion 35 is inserted into the insertion concave portion 34 (see FIG. 13), the air is compressed in the space C on the outer peripheral side of the convex portion 35, the compressed air functions as the air damper. Since the air remaining in the space C formed as the compression space functions as the air damper, the pressure that prevents the piston 27 from moving in the first direction is applied to the piston 27, and the piston 27 is decelerated.

Even in a configuration in which the insertion concave portion 34 is formed in the cylinder 21 and the convex portion 35 is provided on the piston 27 as described above, since the action of the damper caused by the compressed air is generated with respect to the piston 27, it is possible to prevent the contact between the tip end surface 28b of the piston 27 and the blocking surface 25a of the cylinder 21 when the piston 27 is moved.

In a configuration in which the inner wall portion 36 is provided (see FIG. 12), the operation portion 28 of the piston 27 may be provided with an insertion portion 37 inserted into the inside of the inner wall portion 36. Alternatively, in a configuration in which the inner wall portion 36 is not provided (see FIG. 13), the operation portion 28 of the piston 27 may be provided with an insertion portion 38 inserted into the inside of the connecting protrusion portion 23.

However, in a configuration in which the insertion concave portion 34 is formed in the cylinder 21 (see FIGS. 12 and 13), a thickness in the cylinder 21 in the front-rear direction is required to form the insertion concave portion 34 at a rear end portion of the piston support portion 22.

On the other hand, in the configuration (see FIG. 2) in which the insertion convex portion 21a is provided on the cylinder 21 and the concave portion 28c is formed in the piston 27 as described above, it is not necessary to particularly thicken the rear end portion of the piston support portion 22.

Since the concave portion 28c is formed in the operation portion 28 of the piston 27 and the insertion convex portion 21a is provided on the piston support portion 28 of the piston 27, a size of the piston support portion 28 can be reduced in the moving direction of the piston 27, so that the foreign substance removal device 1 can be reduced in the size.

Next, a foreign substance removing device according to the second embodiment will be described (see FIGS. 1, 3, 14 to 20). The foreign substance removing device according to the second embodiment described below is different from the foreign substance removing device according to the first embodiment only in that the insertion convex portion 21a of the cylinder 21 and the concave portion 28c of the piston 27 into which the insertion convex portion 21a is inserted are not formed, and a shape of the piston support portion 22 of the cylinder 21 is different. Therefore, the foreign substance removing device according to the second embodiment will be described in detail only for the parts that are different from those in the first embodiment. The other parts will be denoted by the same reference numerals as those in the first embodiment, and the description thereof will be omitted.

Figure 14:
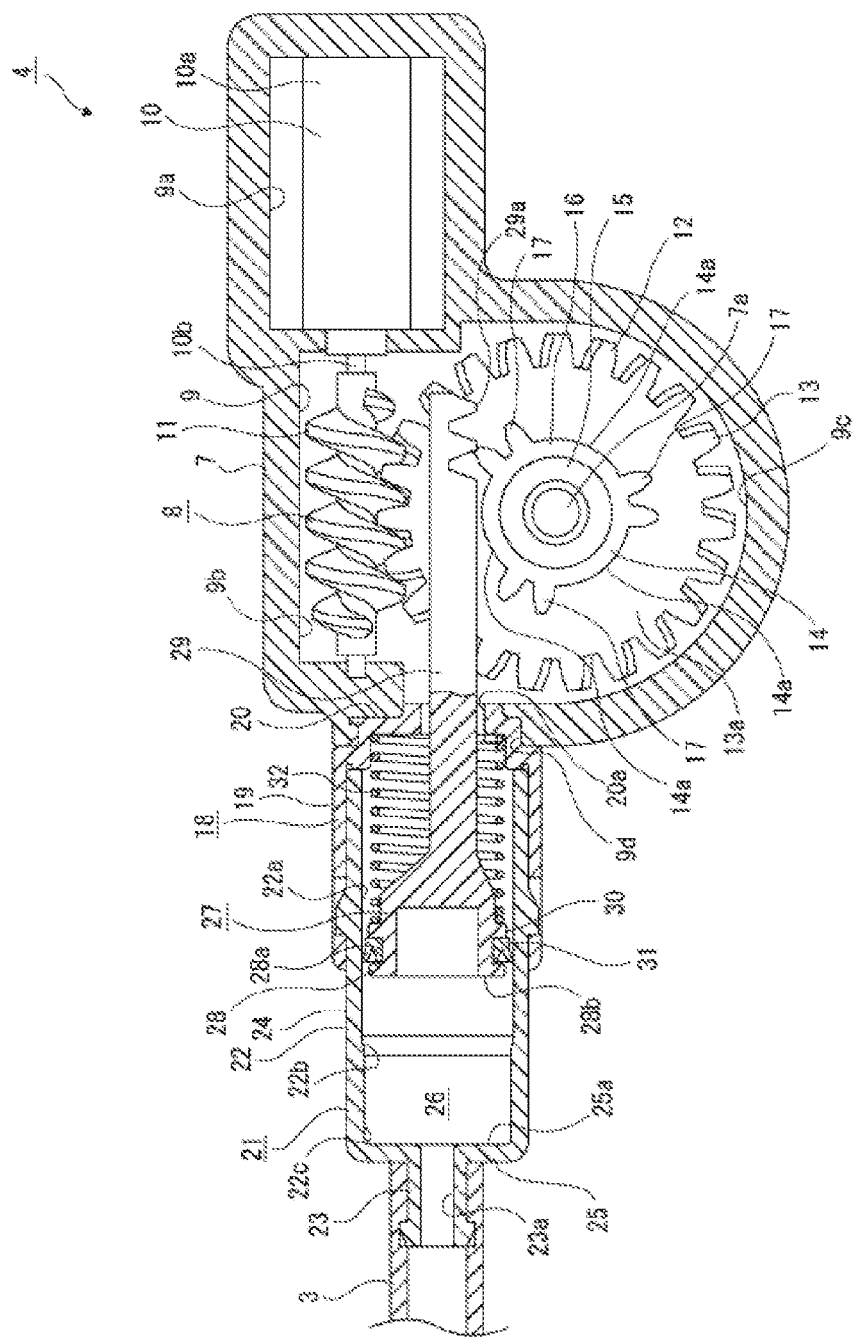
FIG. 14 together with FIGS. 15 to 20 shows a second embodiment, and is a sectional view showing an internal structure of a high-pressure air generating unit.

Configuration of Foreign Substance Removing Device According to Second Embodiment The high-pressure air generating unit 4 includes the case body 7 and the moving mechanism 8 arranged inside the case body 7 (see FIG. 14). The high-pressure air generating unit 4 is attached to the part of the vehicle body inside the vehicle.

The cylinder 21 is formed by integrally forming the piston support portion 22 and the connecting protrusion portion 23 protruding rearward from the piston support portion 22, for example, and the diameter of the piston support portion 22 is larger than the diameter of the connecting protrusion portion 23.

In the inner peripheral surface of the piston support portion 22, a large-diameter portion 22a having a constant diameter, an inclined portion 22b that is gently inclined such that a diameter thereof decreases toward the rear, and a small-diameter portion 22c having a constant diameter are successively continuously formed from a front side, and the diameter of the large-diameter portion 22a is slightly larger than the diameter of the small-diameter portion 22c.

The outer diameter of the operation portion 28 is slightly smaller than the diameter of the small-diameter portion 22c of the piston support portion 22.

Operation of Foreign Substance Removing Device According to Second Embodiment

The operation of the foreign substance removing device 1 will be described below (see FIGS. 15 to 18).

Figure 15:
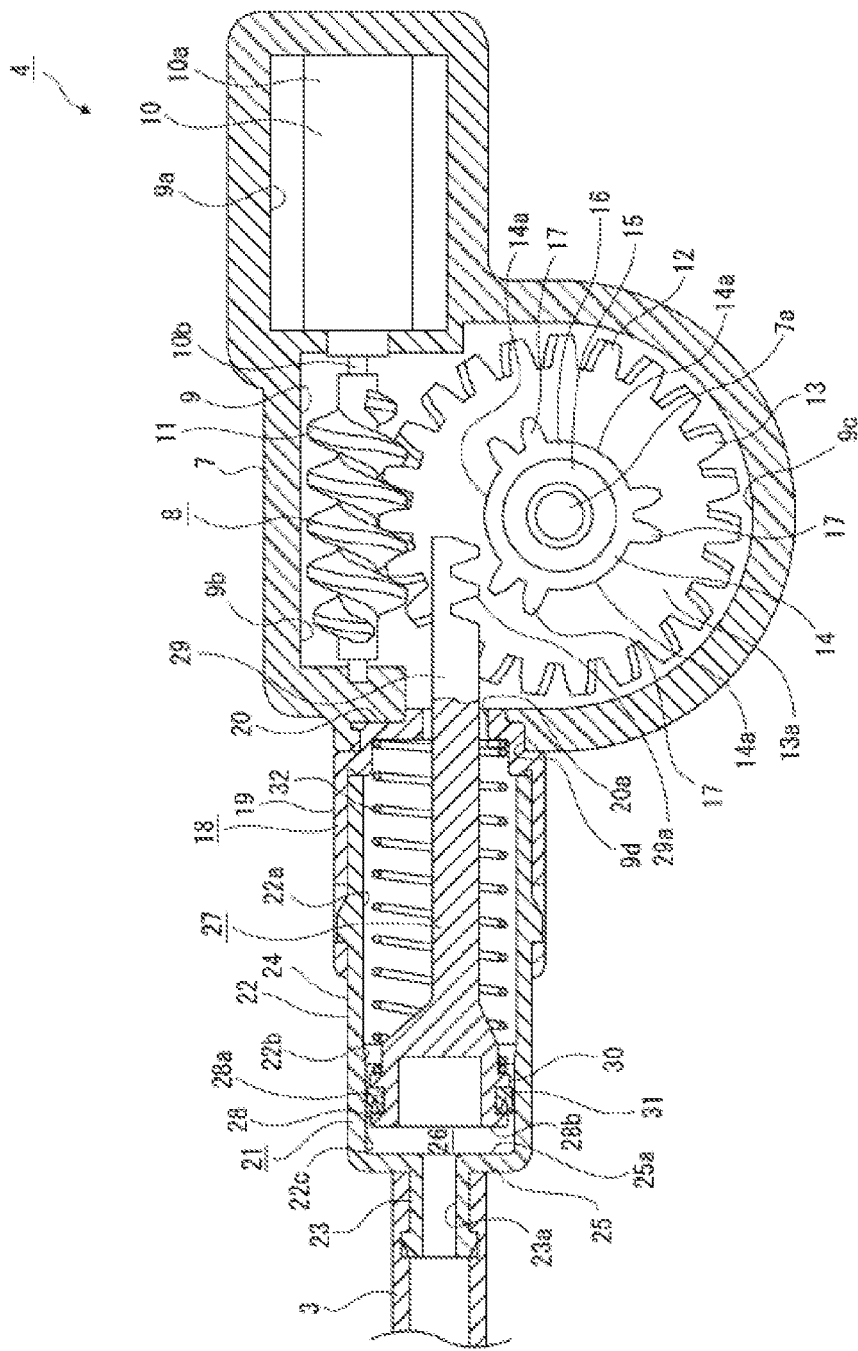
FIG. 15 is a sectional view showing an initial state when a piston is moved in a first direction.

First, the initial state before the high-pressure air is sent out will be described (see FIG. 15).

In the initial state, the piston 27 is positioned on the rear side in the moving direction, and the piston 27 is positioned in the state in which the rack portion 29a can mesh with the gear portions 17, 17, and 17 of the pinion 14. At this time, the piston 27 is in a state in which the seal member 31 attached to the operation portion 28 is in contact with the small-diameter portion 22c of the piston support portion 22 in the cylinder 21.

Figure 16:
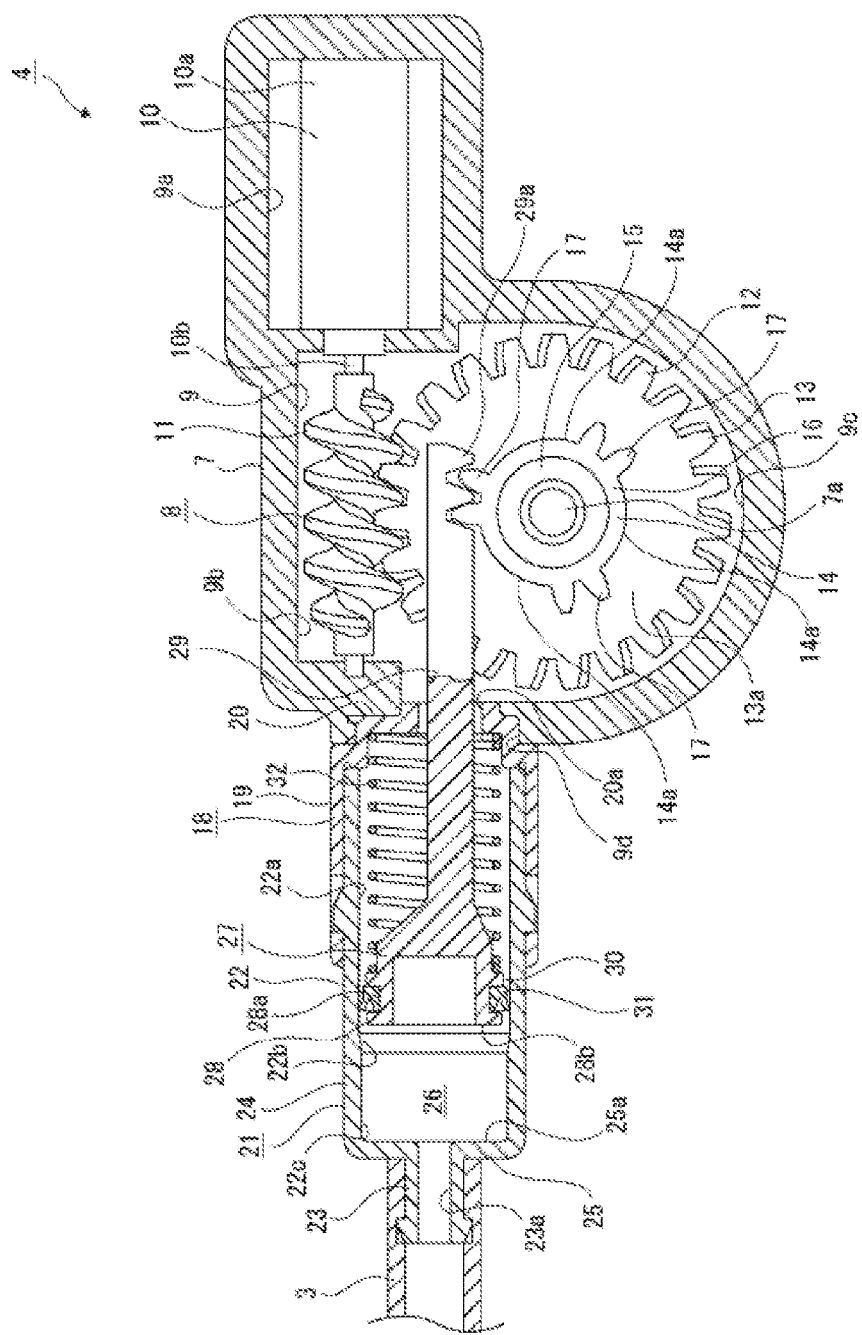
FIG. 16 is a sectional view showing a state in which the piston is moved in a second direction.

When the driving of the driving motor 10 is started in the initial state and the driving force of the driving motor 10 is transmitted to the worm wheel 12 via the worm 11, the gear portion 17 of the pinion 14 is meshed with the rack portion 29a of the piston 27 (see FIG. 16). Accordingly, the piston 27 is moved in the second direction against the urging force of the urging spring 32 along with the rotation of the pinion 14.

When the piston 27 is moved in the second direction, the air outside the foreign substance removing device 1 is taken into the moving space 26 through, for example, the nozzle 6, the pipe 3, and the connecting protrusion portion 23 of the cylinder 21.

When the piston 27 is moved in the second direction along with the rotation of the pinion 14, the meshing between the gear portion 17 and the rack portion 29a is released at the predetermined position. When the piston 27 is moved to the predetermined position in the second direction, the seal member 31 attached to the operation portion 28 is in contact with the large-diameter portion 22a of the piston support portion 22 of the cylinder 21.

When the meshing between the gear portion 17 and the rack portion 29a is released, the piston 27 is moved in the first direction at the higher speed than the moving speed in the second direction by the urging force of the urging spring 32, and the air in the moving space 26 passes through the sending-out path 23a of the connecting protrusion portion 23 and is sent toward the nozzle 6 via the pipe 3. At this time, since the diameter of the connecting protrusion portion 23 is smaller than the diameter of the piston support portion 22 in the cylinder 21, the air sent out from the moving space 26 through the sending-out path 23a is compressed to become the high-pressure air, and sent out from the pipe 3 toward the nozzle 6, so that the high-pressure air is ejected from the nozzle 6 and blown to the lens portion 101 of the imaging portion in the in-vehicle camera 100.

When the high-pressure air ejected from the nozzle 6 is blown to the lens portion 101, the foreign substances such as dust, mud, and water droplets adhering to the lens portion 101 are blown off, and the lens portion 101 is cleaned to eliminate the contamination.

When the piston 27 is moved in the first direction by the urging force of the urging spring 32, the seal member 31 slides on the inner peripheral surface of the cylinder 21 and contacts with the small-diameter portion 22c from the large-diameter portion 22a of the piston support portion 22 via the inclined portion 22b.

Figure 17:
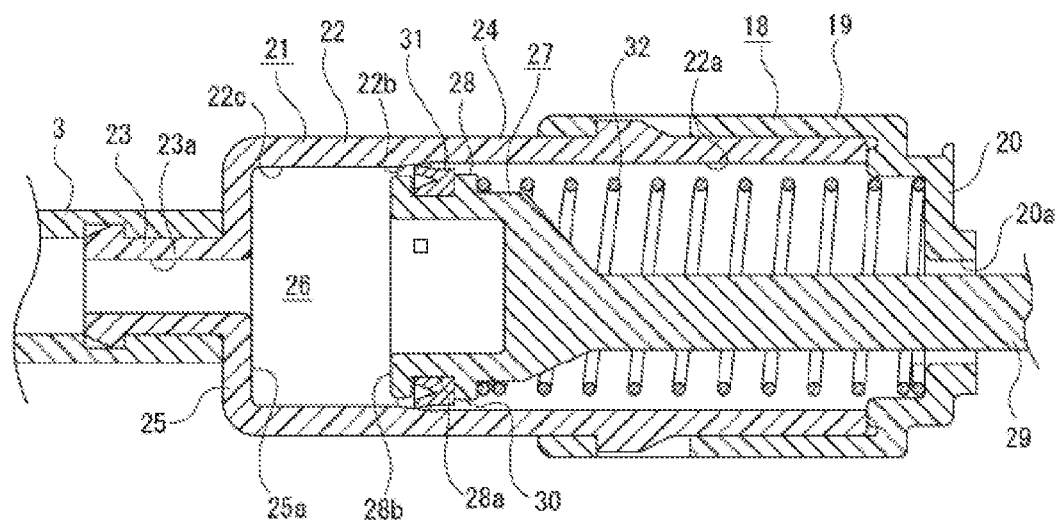
FIG. 17 is an enlarged sectional view showing a state in which a seal member is in contact with an inclined portion.

When the seal member 21 is in contact with the inclined portion 22b from the large-diameter portion 22a, the seal member 21 is elastically deformed in a direction in which a diameter thereof decreases (see FIG. 17). Therefore, a frictional force between the seal member 21 and the inclined portion 22b is made larger than a frictional force between the seal member 21 and the large-diameter portion 22a, and the piston 27 is decelerated.

Figure 18:
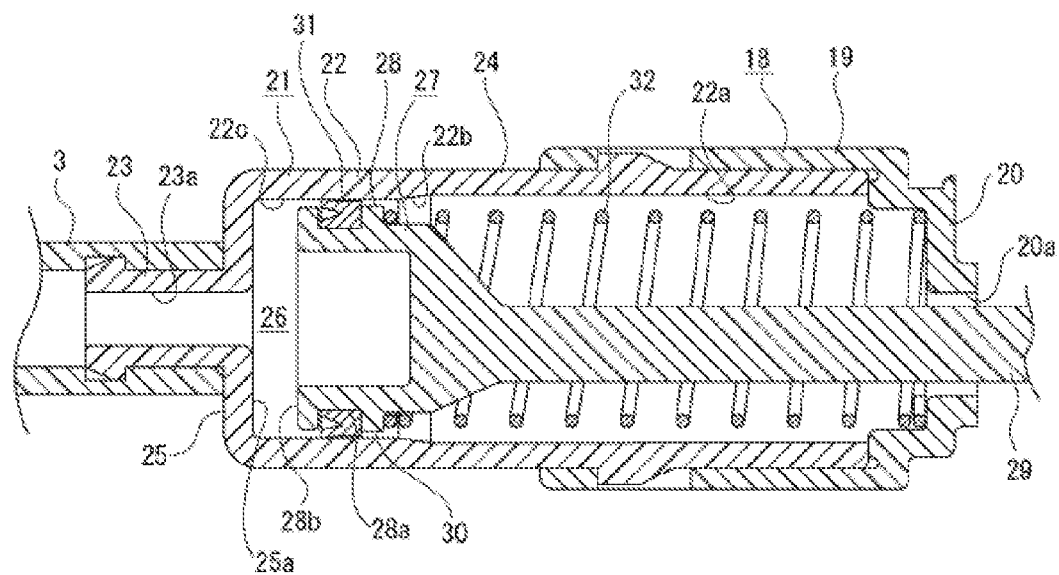
FIG. 18 is an enlarged sectional view showing a state in which the seal member is in contact with a small-diameter portion.

When the seal member 21 is in contact with the small-diameter portion 22c from the inclined portion 22b, the seal member 21 is elastically deformed in a direction in which the diameter thereof further decreases (see FIG. 18). Therefore, a frictional force between the seal member 21 and the small-diameter portion 22c is made larger than the frictional force between the seal member 21 and the inclined portion 22b, and the piston 27 is further decelerated.

Since the piston 27 is decelerated by increasing the frictional force between the seal member 21 and the inner peripheral surface of the piston support portion 22 as it goes in the first direction as described above, the piston 27 is stopped before the tip end surface 28b of the operation portion 28 contacts with the stopper surface 25a of the blocking portion 25 of the cylinder 21, and the tip end surface 28b does not contact with the stopper surface 25a.

Depending on a value of the urging force of the urging spring 32 and a value of the frictional force between the seal member 21 and the inner peripheral surface of the piston support portion 22, there is a possibility that tip end surface 28b contacts with the stopper surface 25a. However, even in this case, since the tip end surface 28b is in contact with the stopper surface 25a while the piston 27 is decelerated, an impact transmitted from the piston 27 to the cylinder 21 is small.

The reciprocating motion of the piston 27 described above is performed as one cycle by the meshing and the releasing of the meshing between the gear portion 17 of the pinion 14 and the rack portion 29a of the piston 27, and the piston 27 is moved in the first direction due to the tooth missing portion 14a of the pinion 14.

Since the piston 27 is moved in the first direction due to the tooth missing portion 14a, it is not necessary to provide the dedicated mechanism for moving the piston 27 in the first direction, so that the foreign substance removing device 1 can be reduced in the size by simplifying the mechanism.

Since the foreign substance removing device 1 includes the gear portions 17, 17, and 17 at the three positions apart from each other in the peripheral direction of the pinion 14, and the three tooth missing tooth portions 14a, 14a, and 14a are formed, the reciprocating motion of the piston 27 is performed three times (three cycles) in the one rotation of the pinion 14.

Therefore, the number of ejection times of the high-pressure air from the nozzle 6 with respect to the one rotation of the pinion 14 is large, and the ejection efficiency in the foreign substance removing device 1 can be improved. Incidentally, the number of the gear portions 17 of the pinion 14 is not limited to three, and may be one or two, or four or more.

Summary of Second Embodiment

As described above, in the foreign substance removing device 1, as a part of the inner peripheral surface of the cylinder 21, the inclined portion 22b having a diameter that decreases in the first direction is formed.

Since the frictional force between the inner peripheral surface of the cylinder 21 and the seal member 31 is increased by the inclined portion 22b, the contact between the tip end surface 28b of the piston 27 and the stopper surface 25a of the cylinder 21 is prevented, or the tip end surface 28b of the piston 27 is brought into contact with the stopper surface 25a of the cylinder 21 at a low speed, so that the generation of the abnormal noise and the generation of the vibration due to the contact can be prevented.

In addition, since the generation of the abnormal noise and the generation of the vibration can be prevented, it is also possible to prevent the driver or the passenger from feeling uncomfortable.

Further, as a part of the inner peripheral surface of the cylinder 21, the large-diameter portion 22a and the small-diameter portion 22c having the constant diameters are formed, and the inclined portion 22b is positioned between the large-diameter portion 22a and the small-diameter portion 22c.

Since the pressure applied to the seal member 31 from the large-diameter portion 22a and the small-diameter portion 22c is constant and a large frictional force is generated between the small-diameter portion 22c and the seal member 31, the piston 27 can be decelerated after ensuring a smooth movement state of the piston 27.

In addition, the cylinder 21 includes the piston support portion 22 supporting the piston 27 and the connecting protrusion portion 23 connected to the piston support portion 22, and the high-pressure air is sent out from the connecting protrusion portion 23, and an axial direction of the connecting protrusion portion 23 coincides with the moving direction of the piston 27.

Since the air is sent out from the connecting protrusion portion 23 whose axial direction coincides with the moving direction of the piston 27, it is possible to easily perform control related to the delivery of the air and to improve a degree of freedom relating to an arrangement of the foreign substance removing device 1.

Others (Second Embodiment)

Figure 19:
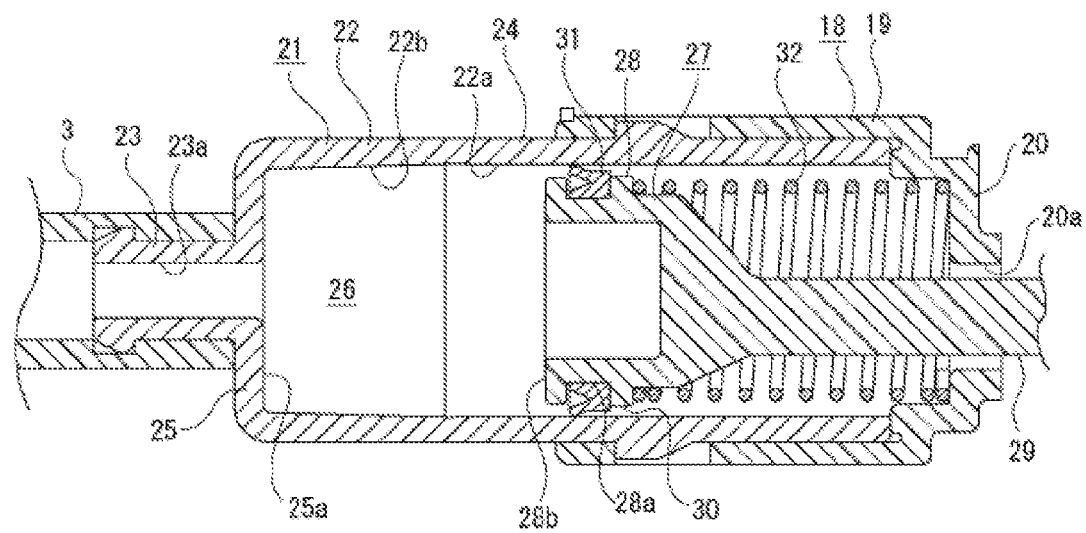
FIG. 19 is an enlarged sectional view showing a configuration in which the small-diameter portion is not formed on an inner peripheral surface of a cylinder.
Figure 20:
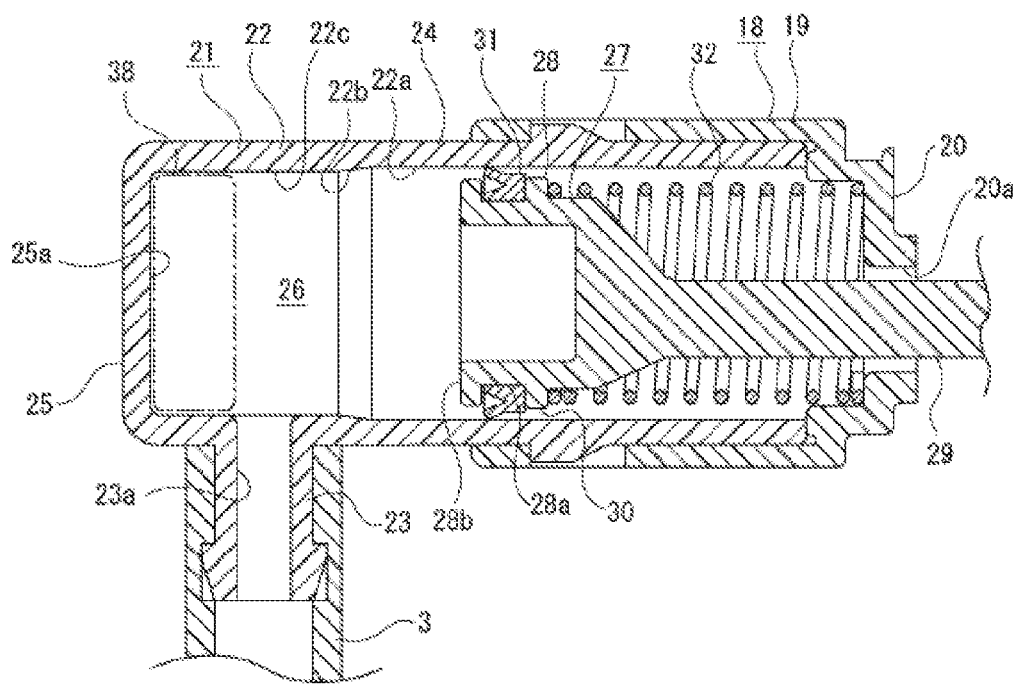
FIG. 20 is an enlarged sectional view showing a configuration in which an axial direction of a connecting protrusion portion is orthogonal to a moving direction of the piston.

Although an example is shown in which the large-diameter portion 22a, the inclined portion 22b, and the small-diameter portion 22c are formed on the inner peripheral surface of the cylinder 21, it is also possible to adopt a configuration in which the inner peripheral surface of the cylinder 21 is formed with the large-diameter portion 22a and the inclined portion 22b and is not formed with the small-diameter portion 22c, for example (see FIG. 19).

In this case, a front end of the inclined portion 22b is continued to a rear end of the large-diameter portion 22a, and a rear end of the inclined portion 22b is continued to an outer periphery of the stopper surface 25a.

In such a configuration, since the frictional force between the inner peripheral surface of the cylinder 21 and the seal member 31 is increased by the inclined portion 22b, the contact between the tip end surface 28b of the piston 27 and the stopper surface 25a of the cylinder 21 is prevented, or the tip end surface 28b of the piston 27 is brought into contact with the stopper surface 25a of the cylinder 21 at the low speed, so that the generation of the abnormal noise and the generation of the vibration due to the contact can be prevented.

In addition, since the generation of the abnormal noise and the generation of the vibration can be prevented, it is also possible to prevent the driver or the passenger from feeling uncomfortable.

Further, since there is no other surface between the inclined portion 22b and the stopper surface 25a, the cylinder 21 can be easily formed and the moving speed of the piston 27 can be controlled by an inclination angle of the inclined portion 22b, so that the degree of freedom in design can be improved.

Although an example is shown in which the moving direction of the piston 27 and the axial direction of the connecting protrusion portion 23 are coincident with each other as described above, the moving direction of the piston 27 and the axial direction of the connecting protrusion portion 23 can also be different from each other, for example, orthogonal directions (see FIG. 20), for example.

In this case, it is desirable that the connecting protrusion portion 23 is positioned at a front side of the stopper surface 25a, and a constant space 38 is formed between the connecting protrusion portion 23 and the blocking portion 25 inside the cylinder 21.

In such a configuration, the friction force between the inner peripheral surface of the cylinder 21 and the seal member 31 is increased by the inclined portion 22b, and when the piston 27 is moved in the first direction, the air can be compressed and be used as the air damper since the air is confined in the space 38.

Therefore, the contact between the tip end surface 28b of the piston 27 and the stopper surface 25a of the cylinder 21 is prevented, or the tip end surface 28b of the piston 27 is brought into contact with the stopper surface 25a of the cylinder 21 at the low speed, so that the piston 27 can be efficiently decelerated by adding an effect of the air damper to an effect of the frictional force, and the generation of the abnormal noise and the generation of the vibration due to the contact can be prevented.

In addition, since the generation of the abnormal noise and the generation of the vibration can be prevented, it is also possible to prevent the driver or the passenger from feeling uncomfortable.

Even in a configuration in which the moving direction of the piston 27 and the axial direction of the connecting protrusion portion 23 are different from each other, it is possible to adopt the configuration in which the inner peripheral surface of the cylinder 21 is formed with the large-diameter portion 22a and the inclined portion 22b and is not formed with the small-diameter portion 22c.

Next, a foreign substance removing device according to the third embodiment will be described (see FIGS. 1, 3, 21 to 27). The foreign substance removing device according to the third embodiment described below is different from the foreign substance removing device according to the first embodiment only in that the insertion convex portion 21a of the cylinder 21 and the concave portion 28c of the piston 27 into which the insertion convex portion 21a is inserted are not formed, and a check valve 39 is arranged in the pipe 3. Therefore, the foreign substance removing device according to the second embodiment will be described in detail only for the parts that are different from those in the first embodiment. The other parts will be denoted by the same reference numerals as those in the first embodiment, and the description thereof will be omitted.

Figure 21:
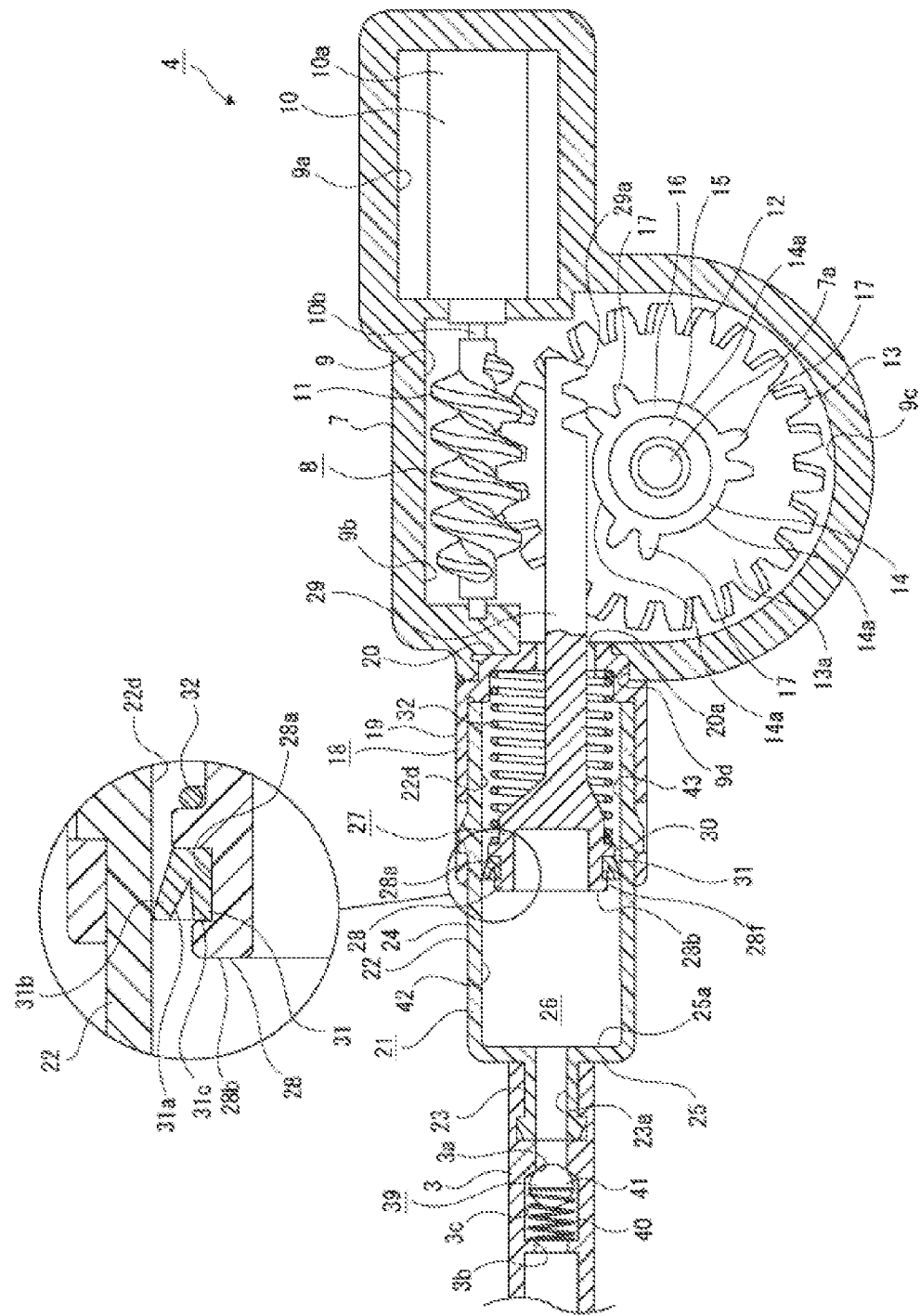
FIG. 21 together with FIGS. 22 to 27 shows a third embodiment, and is a sectional view showing an internal structure of a high-pressure air generating unit.

Configuration of Foreign Substance Removing Device According to Third Embodiment The high-pressure air generating unit 4 includes the case body 7 and the moving mechanism 8 arranged inside the case body 7 (see FIG. 21). The high-pressure air generating unit 4 is attached to the part of the vehicle body inside the vehicle.

The cylinder 21 is formed by integrally forming the piston support portion 22 and the connecting protrusion portion 23 protruding rearward from the piston support portion 22, for example, and the diameter of the piston support portion 22 is larger than the diameter of the connecting protrusion portion 23.

The outer diameter of the operation portion 28 is slightly smaller than an inner diameter of the piston support portion 22.

The seal member 31 is attached to the operation portion 28 in the state of being inserted into the arrangement groove 28a. The seal member 31 is formed into an annular shape, and the seal member 31 is formed with an annular groove portion 31a opened forward. The seal member 31 is formed of an elastically deformable material, for example, rubber or resin, an outer peripheral portion 31b protrudes outward from an outer peripheral surface 28f of the operation portion 28, at least a part of the groove portion 31a is positioned outside the outer peripheral surface 28f of the operation portion 28, and an inner peripheral portion 31c is inserted into the arrangement groove 28a.

An air inflow hole (not shown) is formed into the piston support portion 22. The air inflow hole is positioned on a front side of the operation portion 28 in a state in which the piston 27 is moved in the second direction to a moving end on a front side, and is communicated with, for example, a vehicle interior or the like. Therefore, air in the vehicle interior or the like can flow into an inner portion of the piston 21 from the air inflow hole. Incidentally, a means for removing dust such as a filter may be provided at an inflow path of the air into the air inflow hole.

The pipe 3 includes two portions protruding inward with respect to the other portions so as to be separated from each other in the front-rear direction. An opening edge on the rear side in a front portion protruding inward is formed as a first opening edge 3a, and an opening edge on a front portion in the rear portion protruding inward is formed as a second opening edge 3b. In a space inside the pipe 3, a space between the first opening edge 3a and the second opening edge 3b is formed as a valve arrangement space 3c.

The check valve 39 is arranged in the valve arrangement space 3c. The check valve 39 includes, for example, a compression coil spring 40 and a spherical opening/closing body 41, a rear end portion of the compression coil spring 40 is pressed against the second opening edge 3b, and the spherical opening/closing body 41 is urged in the second direction by an urging force of the compression coil spring 40. The spherical opening/closing body 41 is pressed against the first opening edge 3a by the urging force of the compression coil spring 40, so that the flow of air between the inside of the cylinder 21 and the inside of the nozzle 6 is regulated.

A space inside the cylinder 21 and the pipe 3 at a portion between the check valve 39 and the operation portion 28 of the piston 27 is a generation space 42 in which the air is compressed and the high-pressure air is generated when the piston 27 is moved in the first direction, and a space inside the cylinder 21 and the receiving holder 18 at a portion on a front side of the operation portion 28 is an inflow space 43 into which the air can flow from the air inflow hole.

Operation of Foreign Substance Removing Device According to Third Embodiment

The operation of the foreign substance removing device 1 will be described below (see FIGS. 22 to 25).

Figure 22:
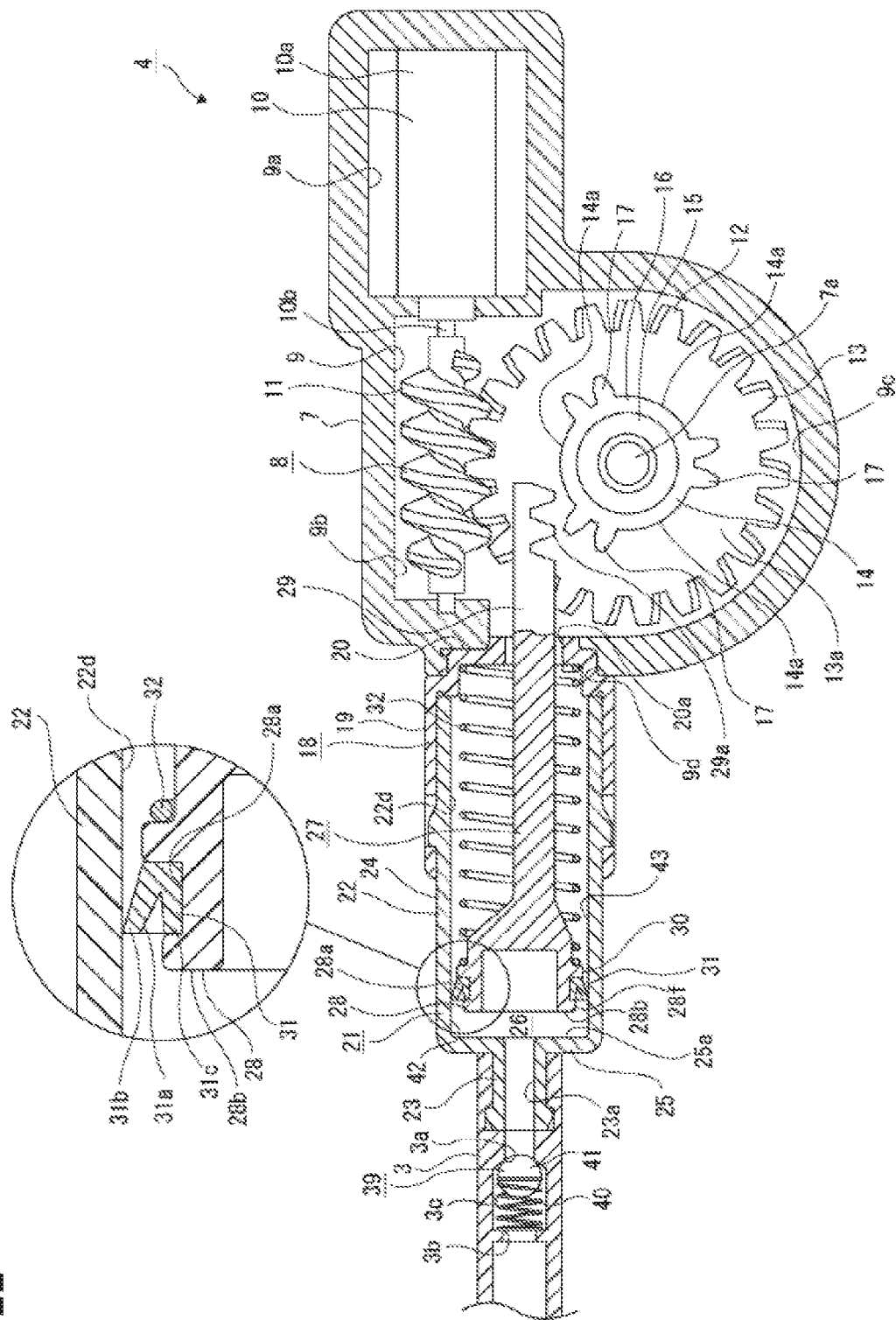
FIG. 22 is a sectional view showing an initial state when a piston is moved in a first direction.

First, the initial state before the high-pressure air is sent out will be described (see FIG. 22).

In the initial state, the piston 27 is positioned on the rear side in the moving direction, and the piston 27 is positioned in the state in which the rack portion 29a can mesh with the gear portions 17, 17, and 17 of the pinion 14. At this time, in the piston 27, at least a part of the outer peripheral portion 31b of the seal member 31 attached to the operation portion 28, for example, a rear end portion of the outer peripheral portion 31b is in contact with an inner peripheral surface 22d of the cylinder 21.

Figure 23:
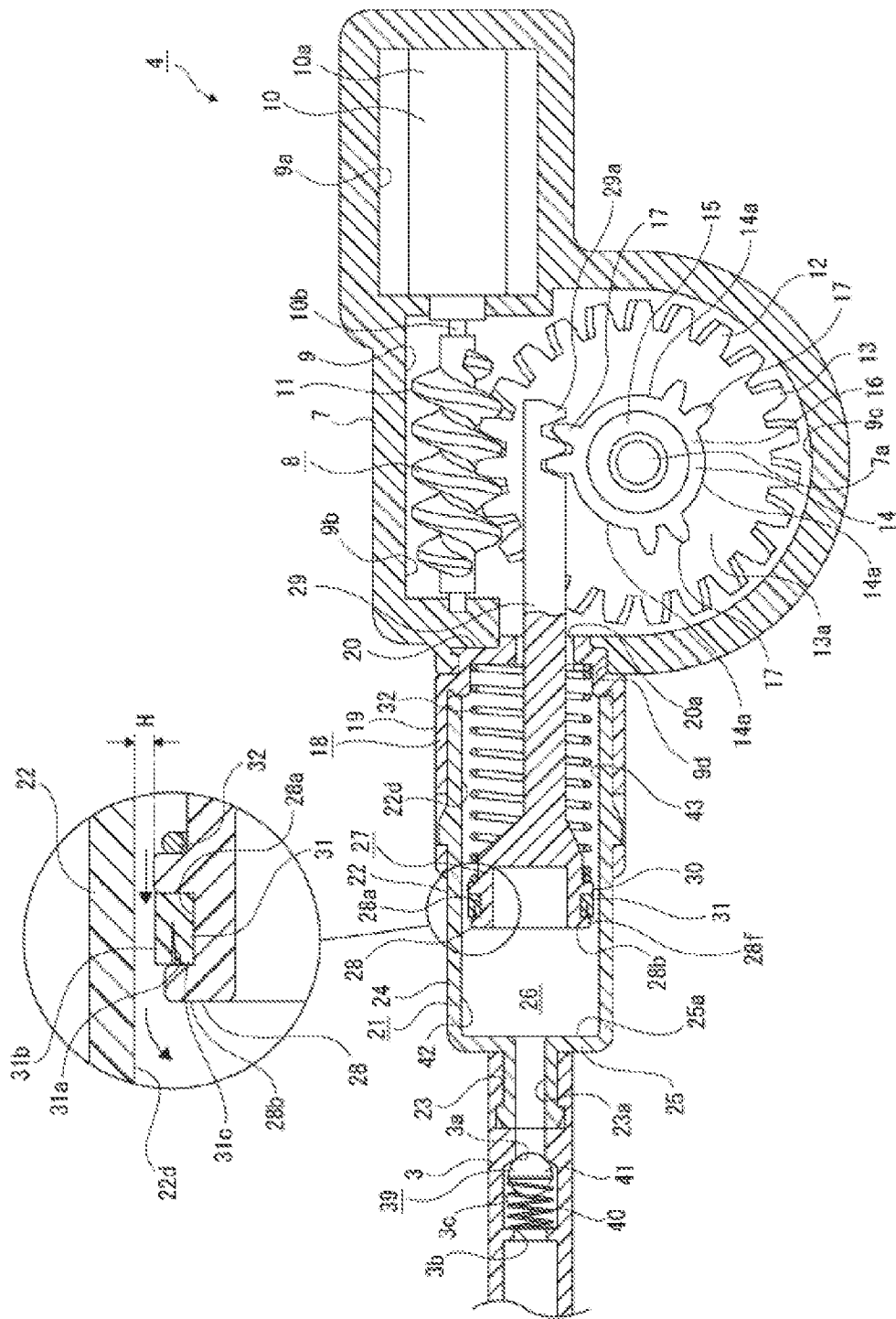
FIG. 23 is a sectional view showing a state in which the piston is moved in a second direction.

When the driving of the driving motor 10 is started in the initial state and the driving force of the driving motor 10 is transmitted to the worm wheel 12 via the worm 11, the gear portion 17 of the pinion 14 is meshed with the rack portion 29a of the piston 27 (see FIG. 23). Accordingly, the piston 27 is moved in the second direction against the urging force of the urging spring 32 along with the rotation of the pinion 14.

When the piston 27 starts to move in the second direction, the spherical opening/closing body 41 of the check valve 39 is pressed against the first opening edge 3a of the pipe 3 by the urging force of the compression coil spring 40. As the piston 27 is moved in the second direction, the generation space 42 has a negative pressure from the inflow space 43, and a difference of internal pressure is generated between the generation space 42 and the inflow space 43. Therefore, pressure is applied to the outer peripheral portion 31b of the seal member 31 by the air present in the inflow space 43, the outer peripheral portion 31b is elastically deformed in a direction approaching the inner peripheral portion 31c, and the seal member 31 is shaped such that the groove portion 31a is narrowed. When the outer peripheral portion 31b of the seal member 31 is elastically deformed in the direction approaching the inner peripheral portion 31c, the seal member 31 is separated from the inner peripheral surface 22d of the cylinder 21 to form a gap H therebetween, and the air in the vehicle interior or the like flows into the generation space 42 from the gap H through the inflow space 43 from the air inflow hole.

The air that has flowed into the generation space 42 is, for example, air that has flowed in from the vehicle interior or the like, is clean air that has a low content of dust and moisture, and particularly clean air in a case where the means for removing dust such as the filter is provided at the inflow path of the air into the air inflow hole.

When the piston 27 is moved in the second direction along with the rotation of the pinion 14, the meshing between the gear portion 17 and the rack portion 29a is released at the predetermined position. At this time, since the air flows into the generation space 42 along with the movement of the piston 27 in the second direction, the difference of the internal pressure between the generation space 42 and the inflow space 43 becomes smaller, the outer peripheral portion 31b of the seal member 31 is elastically restored, and at least a part of the outer peripheral portion 31b is in contact with the inner peripheral surface 22d of the cylinder 21.

Figure 24:
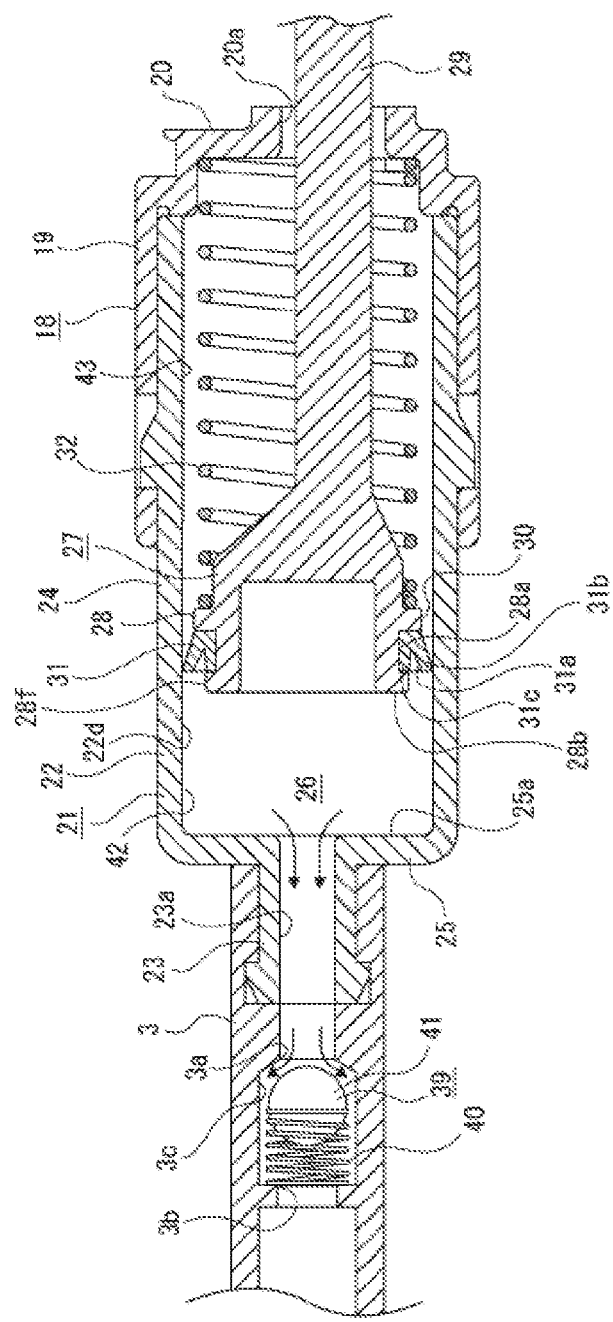
FIG. 24 is an enlarged sectional view showing a middle state in which the piston is moved in the first direction.
Figure 25:
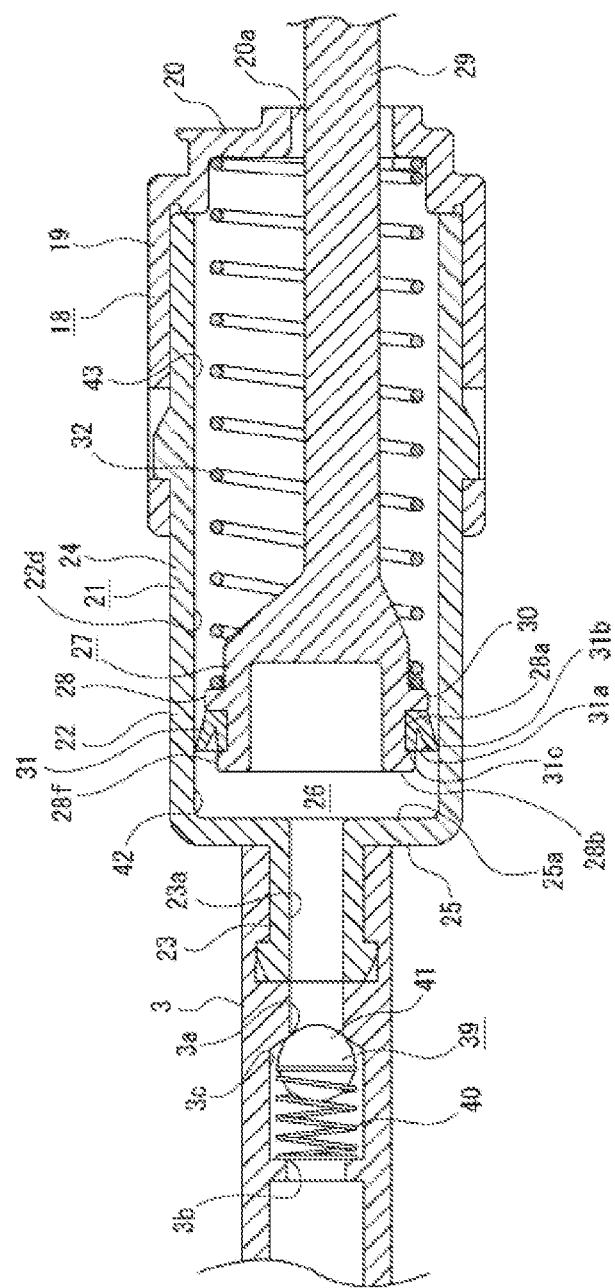
FIG. 25 is an enlarged sectional view showing a state in which the piston is moved in the first direction to a moving end.

When the meshing between the gear portion 17 and the rack portion 29a is released, the piston 27 is moved in the first direction at the higher speed than the moving speed in the second direction by the urging force of the urging spring 32 (see FIG. 24). At this time, since the diameter of the connecting protrusion portion 23 is smaller than the diameter of the piston support portion 22 in the cylinder 21, the air present in the generation space 42 is compressed, and the internal pressure is increased. Accordingly, the pressure in the first direction is applied to the spherical opening/closing body 41 of the check valve 39, the compression coil spring 40 is compressed, the spherical opening/closing body 41 is moved in the first direction, and an opening of the first opening edge 3a is opened.

The air in the generation space 42 becomes high-pressure air, and is sent toward the nozzle 6 through the pipe 3 through the sending-out path 23a of the connecting protrusion portion 23, so that the high-pressure air is jetted from the nozzle 6 and blown to the lens portion 101 of the imaging portion in the in-vehicle camera 100.

When the piston 27 is moved in the first direction, as described above, since the air is compressed in the generation space 42, and the internal pressure is increased, the inflow space 43 has a negative pressure from the generation space 42, and the difference of the internal pressure is generated between the generation space 42 and the inflow space 43. Therefore, pressure in a direction in which the groove portion 31a expands is applied to the outer peripheral portion 31b by the air present in the groove portion 31a of the seal member 31, the outer peripheral portion 31b is elastically restored in a direction away from the inner peripheral portion 31c, and the seal member 31 is in contact with the inner peripheral surface 22d of the cylinder 21.

When the high-pressure air ejected from the nozzle 6 is blown to the lens portion 101, the foreign substances such as dust, mud, and water droplets adhering to the lens portion 101 are blown off, and the lens portion 101 is cleaned to eliminate the contamination.

When the piston 27 is moved in the first direction by the urging force of the urging spring 32, the seal member 31 slides on the inner peripheral surface 22d of the cylinder 21. When the piston 27 is moved to a predetermined position in the first direction, since the high-pressure air is sent toward the nozzle 6 through the pipe 3, the internal pressure of the generation space 42 is reduced, the compression coil spring 40 is expanded, the spherical opening/closing body 41 is moved in the second direction, and the opening of the first opening edge 3a is blocked again (see FIG. 25).

The reciprocating motion of the piston 27 described above is performed as one cycle by the meshing and the releasing of the meshing between the gear portion 17 of the pinion 14 and the rack portion 29a of the piston 27, and the piston 27 is moved in the first direction due to the tooth missing portion 14a of the pinion 14.

Since the piston 27 is moved in the first direction due to the tooth missing portion 14a, it is not necessary to provide the dedicated mechanism for moving the piston 27 in the first direction, so that the foreign substance removing device 1 can be reduced in the size by simplifying the mechanism.

Since the foreign substance removing device 1 includes the gear portions 17, 17, and 17 at the three positions apart from each other in the peripheral direction of the pinion 14, and the three tooth missing tooth portions 14a, 14a, and 14a are formed, the reciprocating motion of the piston 27 is performed three times (three cycles) in the one rotation of the pinion 14.

Therefore, the number of ejection times of the high-pressure air from the nozzle 6 with respect to the one rotation of the pinion 14 is large, and the ejection efficiency in the foreign substance removing device 1 can be improved. Incidentally, the number of the gear portions 17 of the pinion 14 is not limited to three, and may be one or two, or four or more.

Summary of Third Embodiment

In the foreign substance removing device described in Patent Literature 1, when the piston is moved to one side, the fluid (high-pressure air) is ejected from the nozzle, whereas when the piston is moved to the other side, the outside air flows through the same flow path as that of the high-pressure air in the opposite direction and flows into the cylinder.

Therefore, when the foreign substances such as dust and moisture are contained in the outside air, these dust, moisture, or the like may be also flowed into the cylinder together with the outside air, the inner portion of the cylinder may be contaminated, or dust or moisture or the like may be sprayed on an object to be cleaned along with the ejection of the high-pressure air.

However, in the foreign substance removing device 1 as described above, the check valve 39 that regulates the flow of air toward the second direction side is arranged, the seal member 31 is formed with the groove portion 31a opened in the first direction, and when the piston 27 is moved, the seal member 31 is elastically deformed or elastically restored by the difference of the internal pressure between the generation space 42 and the inflow space 43 on the opposite sides of the cylinder 21, in which the seal member 31 is sandwiched between the generation space 42 and the inflow space 43.

When the piston 27 is moved in the first direction, the seal member 31 is pressed against and slid on the inner peripheral surface 22d of the cylinder 21 by the pressure in the direction in which the groove portion 31a expands, whereas when the piston 27 is moved in the second direction, the seal member 31 is elastically deformed by the pressure in the direction in which the groove portion 31a is narrowed so as to form the gap H between the seal member 31 and the inner peripheral surface 22d of the cylinder 21. As a result, when the piston 27 is moved in the second direction, the air flows in the first direction and flows into the generation space 42 from the gap H, and the inflow of the foreign substances such as dust and moisture into the cylinder 21 can be reduced.

In particular, the nozzle 6 is a portion that ejects the air into the object to be cleaned such as the in-vehicle camera 100. Since the outdoor foreign substances such as dust, moisture, and sand are likely to enter the inside of the nozzle 6, the inflow of the foreign substances into the cylinder 21 can be effectively suppressed by adopting a configuration in which the air does not flow into the cylinder 21 from the nozzle 6 side via the pipe 3.

In a case where the fluid is a mixed liquid of a gas and a liquid or a liquid, it is also possible to prevent the liquid remaining inside the nozzle 6 or the pipe 3 from flowing into the cylinder 21.

In the foreign substance removing device 1, at least a part of the groove portion 31a of the seal member 31 is positioned outside the outer peripheral surface 28f of the operation portion 28 of the piston 27.

When the piston 27 is moved in the first direction, the air easily enters the groove portion 31a, and the pressure in the direction in which the groove portion 31a expands is applied to the seal member 31, and the seal member 31 is easily pressed against the inner peripheral surface 22d of the cylinder 21, so that airtightness of the generation space 42 can be increased, and detergency for the object to be cleaned can be increased by increasing ejection pressure of the high-pressure air.

Further, in the foreign substance removing device 1, the pipe 3 is connected to the connecting protrusion portion 23 of the cylinder 21, and the check valve 39 is arranged in the pipe 3.

Since the check valve 39 is arranged in the pipe 3 connecting the nozzle 6 and the cylinder 21, a sufficient arrangement space for the check valve 39 can be ensured, and the degree of freedom in design can be improved by freely setting an interval between the nozzle 6 and the cylinder 21.

In addition, since the axial direction of the connecting protrusion portion 23 coincides with the moving direction of the piston 27, the air is sent out from the connecting protrusion portion 23 whose axial direction coincides with the moving direction of the piston 27, and it is possible to easily perform the control related to the delivery of the air and to improve the degree of freedom relating to the arrangement of the foreign substance removing device 1.

Others (Third Embodiment)

Figure 26:
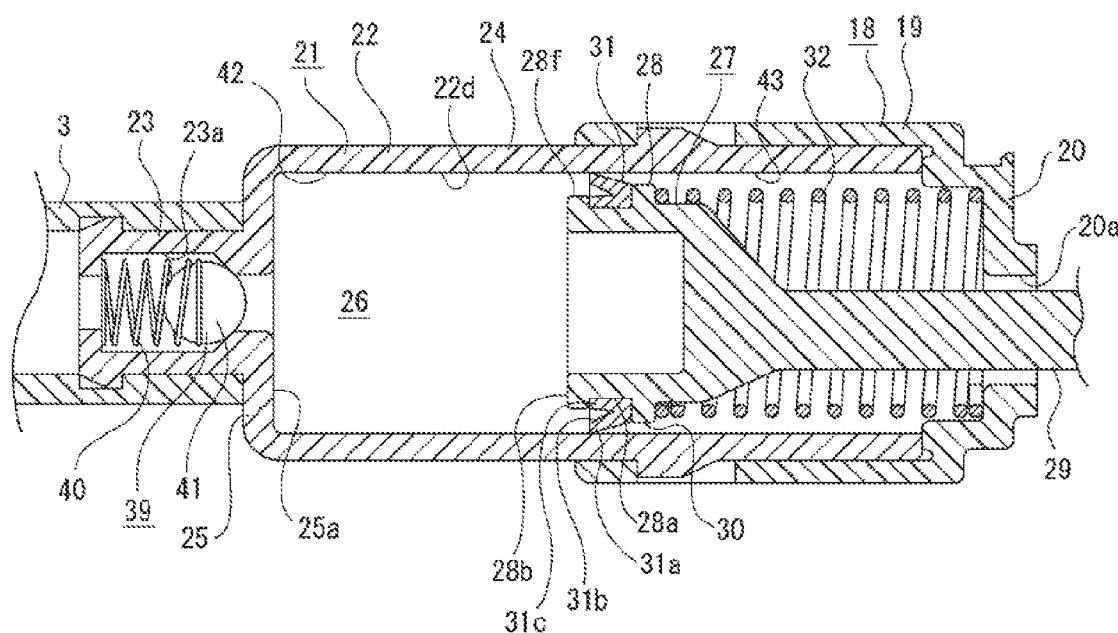
FIG. 26 is an enlarged sectional view showing an example in which a check valve is arranged at a connecting protrusion portion of a cylinder.
Figure 27:
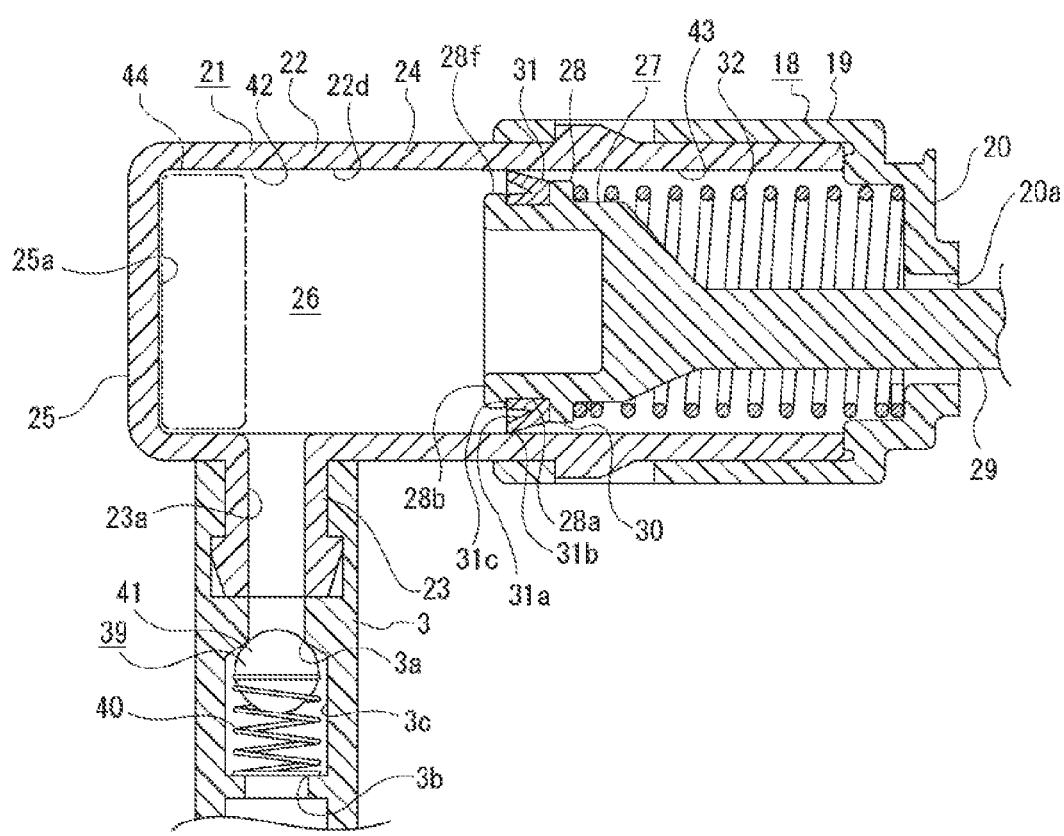
FIG. 27 is an enlarged sectional view showing a configuration in which an axial direction of the connecting protrusion portion is orthogonal to a moving direction of the piston.

Although an example is shown in which the check valve 39 is arranged in the pipe 3 as described above, the check valve 39 may be arranged in the connecting protrusion portion 23 of the cylinder 21 (see FIG. 26).

Since the check valve 39 is arranged in the connecting protrusion portion 23 in this manner, the check valve 39 is arranged in a part of the cylinder 21, so that a dedicated member for arranging the check valve 39 is not required, and the number of components can be reduced and the structure can be simplified.

The check valve 39 may be arranged in the nozzle 6 in addition to the pipe 3 and the cylinder 21.

Although the example is shown in which the moving direction of the piston 27 and the axial direction of the connecting protrusion portion 23 are coincident with each other as described above, and it is also possible to adopt the configuration in which the moving direction of the piston 27 and the axial direction of the connecting protrusion portion 23 are different from each other, for example, 90 degrees (see FIG. 27), for example.

In this case, it is desirable that the connecting protrusion portion 23 is positioned on the front side of the stopper surface 25a, and a constant space 44 is formed between the connecting protrusion portion 23 and the blocking portion 25 inside the cylinder 21.

In such a configuration, when the piston 27 is moved in the first direction, the air can be compressed and be used as the air damper since the air is confined in the space 44.

Therefore, the contact between the tip end surface 28b of the piston 27 and the stopper surface 25a of the cylinder 21 is prevented, or the tip end surface 28b of the piston 27 is brought into contact with the stopper surface 25a of the cylinder 21 at the low speed, so that the generation of the abnormal noise and the generation of the vibration due to the contact can be prevented.

In addition, since the generation of the abnormal noise and the generation of the vibration can be prevented, it is also possible to prevent the driver or the passenger from feeling uncomfortable.

REFERENCE SIGNS LIST 100 in-vehicle camera (object to be cleaned)
1 foreign substance removing device
6 nozzle
8 moving mechanism
21 cylinder
21a insertion convex portion
22 piston support portion
22a large-diameter portion
22b inclined portion
22c small-diameter portion
22d inner peripheral surface
23 connecting protrusion portion
24 tubular portion
25a stopper surface
26 moving space
27 piston
28 operation portion
28b tip end surface
28c concave portion
28e insertion portion
28f outer peripheral surface
31 seal member
31a groove portion
32 urging spring
33 seal ring
34 insertion concave portion
35 convex portion
39 check valve

The invention claimed is:

1. A foreign substance removing device comprising:
a cylinder including a piston support portion of which an internal space is formed as a moving space;
a piston movably supported by the cylinder and configured to send out a fluid that has flowed into the cylinder;
a nozzle configured to eject the fluid sent out by the piston toward an object to be cleaned;
an urging spring configured to urge the piston; and
a moving mechanism configured to apply a moving force to the piston,
wherein a direction in which the fluid is sent out is a first direction of a moving direction of the piston,
wherein the piston is moved in the first direction by an urging force of the urging spring,
wherein the piston includes an operation portion that is moved in the moving space,
wherein the cylinder includes a connecting protrusion portion continuous with the piston support portion,
wherein the connecting protrusion portion is formed into a tubular shape, and the fluid is sent out from the connecting protrusion portion,
wherein:
the operation portion comprises a tubular convex portion that protrudes from a surface perpendicular to the moving direction of the piston, the piston support portion comprises an annular insertion concave portion into which the convex portion is capable of being inserted, and the annular insertion concave portion and the connecting protrusion portion is coaxially arranged;
or the operation portion comprises an annular concave portion that is recessed in the surface perpendicular to the moving direction of the piston, the piston support portion comprises a tubular insertion convex portion that is capable of being inserted into the concave portion, and the tubular insertion convex portion and the connecting protrusion portion is coaxially arranged, and
wherein a compression space of the fluid is formed in the moving space in a state in which the piston is moved in the first direction and the convex portion or the insertion convex portion is inserted into the insertion concave portion or the concave portion.

2. The foreign substance removing device according to claim 1,
wherein the operation portion is formed with the concave portion, and
wherein the piston support portion is formed with the insertion convex portion.

3. The foreign substance removing device according to claim 2,
wherein the concave portion is formed into an annular shape, wherein the insertion convex portion is formed into a tubular shape, and wherein a portion on an inner side of the concave portion of the piston is provided as an insertion portion to be inserted into an inner side of the insertion convex portion.

4. The foreign substance removing device according to claim 3, wherein a seal ring is attached to an outer peripheral portion of the insertion portion or an inner peripheral portion of the insertion convex portion.

5. The foreign substance removing device according to claim 1, wherein a seal member that slides on an inner peripheral surface of the cylinder when the piston is moved is attached to an outer peripheral portion of the operation portion.

6. A foreign substance removing device comprising:

a cylinder into which a fluid flows;

a piston movably supported by the cylinder and configured to send out the fluid that has flowed into the cylinder;

a seal member attached to the piston and slid on an inner peripheral surface of the cylinder when the piston is moved;

a nozzle configured to eject the fluid sent out by the piston toward an object to be cleaned;

an urging spring configured to urge the piston; and a moving mechanism configured to apply a moving force to the piston, wherein a direction in which the fluid is sent out is a first direction of a moving direction of the piston, wherein the piston is moved in the first direction by an urging force of the urging spring, wherein an inclined portion whose diameter decreases as it goes in the first direction is formed as a part of an inner peripheral surface of the cylinder, wherein a large-diameter portion having a constant diameter is formed as a part of the inner peripheral surface of the cylinder, and a small-diameter portion having a constant diameter is formed as a part of the inner peripheral surface of the cylinder, wherein the inclined portion is positioned between the large-diameter portion and the small- diameter portion, and wherein a whole circumference of the seal member is in physical contact with the large- diameter portion when the piston is moved.

7. The foreign substance removing device according to claim 6, wherein the cylinder is formed with a stopper surface that is capable of contacting a tip end surface of the piston when the piston is moved in the first direction, and wherein the inclined portion is formed to be continuous with the stopper surface.

8. The foreign substance removing device according to claim 6, wherein the cylinder includes a piston support portion supporting the piston and a connecting protrusion portion continuous with the piston support portion, wherein the connecting protrusion portion is formed into a tubular shape, and the fluid is sent out from the connecting protrusion portion, and wherein an axial direction of the connecting protrusion portion coincides with the moving direction of the piston.

9. The foreign substance removing device according to claim 6, wherein the cylinder includes a piston support portion supporting the piston and a connecting protrusion portion continuous with the piston support portion, wherein the connecting protrusion portion is formed into a tubular shape, and the fluid is sent out from the connecting protrusion portion, and wherein an axial direction of the connecting protrusion portion is a direction orthogonal to the moving direction of the piston.

10. A foreign substance removing device comprising:

a cylinder into which a fluid flows;

a piston movably supported by the cylinder and configured to send out the fluid that has flowed into the cylinder;

an elastically deformable annular seal member attached to an outer peripheral portion of the piston and slidable on an inner peripheral surface of the cylinder when the piston is moved;

a nozzle configured to eject the fluid sent out by the piston toward an object to be cleaned; and a moving mechanism configured to apply a moving force to the piston, wherein a direction in which the fluid is sent out is a first direction of a moving direction of the piston, and a direction opposite to the first direction is a second direction of the moving direction of the piston, wherein a check valve configured to regulate flow of the fluid toward a second direction side is arranged in a flow path of the fluid in a first direction side of the piston, wherein the seal member is formed with a groove portion opened in the first direction, wherein when the piston is moved, the seal member is elastically deformed or elastically restored by a difference of internal pressure in spaces on opposite sides of the cylinder, the seal member being sandwiched between the spaces, wherein the inner peripheral surface has a uniform diameter along the moving direction of the piston, wherein when the piston is not moved, the seal member is always in physical contact with the inner peripheral surface, wherein when the piston is moved in the second direction, the groove portion narrows such that the seal member is detached from the inner peripheral surface, wherein the check valve comprises a coil spring and a spherical opening/closing body, and wherein the coil spring presses the spherical opening/closing body against an opening edge.

11. The foreign substance removing device according to claim 10, wherein at least a part of the groove portion is positioned outside an outer peripheral surface of the piston.

12. The foreign substance removing device according to claim 10, wherein the cylinder includes a piston support portion supporting the piston and a connecting protrusion portion continuous with the piston support portion, wherein the connecting protrusion portion is formed into a tubular shape, and the fluid is sent out from the connecting protrusion portion, wherein a pipe is connected to the connecting protrusion portion, and wherein the check valve is arranged in the pipe.

13. The foreign substance removing device according to claim 10, wherein the cylinder includes a piston support portion supporting the piston and a connecting protrusion portion continuous with the piston support portion, wherein the connecting protrusion portion is formed into a tubular shape, and the fluid is sent out from the connecting protrusion portion, and wherein the check valve is arranged in the connecting protrusion portion.

14. The foreign substance removing device according to claim 12, wherein an axial direction of the connecting protrusion portion coincides with the moving direction of the piston.

\* \* \* \* \*